United States Patent
Zhou et al.

(10) Patent No.: US 9,373,283 B2
(45) Date of Patent: Jun. 21, 2016

(54) PIXEL CIRCUIT, ORGANIC ELECTROLUMINESCENT DISPLAY PANEL AND DISPLAY DEVICE

(71) Applicants: BOE TECHNOLOGY GROUP CO., LTD., Beijing (CN); Chengdu BOE OPTOELECTRONICS TECHNOLOGY CO., LTD., Chengdu, Sichuan (CN)

(72) Inventors: Quanguo Zhou, Beijing (CN); Xiaojing Qi, Beijing (CN); Fucheng Yang, Beijing (CN); Bin Ji, Beijing (CN)

(73) Assignees: BOE TECHNOLOGY GROUP CO., LTD, Beijing (CN); CHENGDU BOE OPTOELECTRONICS TECHNOLOGY CO., LTD, Chengdu, Sichuan (CN)

( * ) Notice: Subject to any disclaimer, the term of this patent is extended or adjusted under 35 U.S.C. 154(b) by 0 days.

(21) Appl. No.: 14/416,215

(22) PCT Filed: May 15, 2014

(86) PCT No.: PCT/CN2014/077615
§ 371 (c)(1),
(2) Date: Jan. 21, 2015

(87) PCT Pub. No.: WO2015/014146
PCT Pub. Date: Feb. 5, 2015

(65) Prior Publication Data
US 2015/0317932 A1 Nov. 5, 2015

(30) Foreign Application Priority Data
Jul. 31, 2013 (CN) .......................... 2013 1 0329790

(51) Int. Cl.
G09G 3/30 (2006.01)
G09G 3/32 (2016.01)

(52) U.S. Cl.
CPC ................ *G09G 3/3291* (2013.01); *G09G 3/32* (2013.01); *G09G 3/3233* (2013.01);
(Continued)

(58) Field of Classification Search
CPC ..... G06F 3/041; G06F 3/0412; G06F 3/0414; G06F 3/044; G06F 3/045; G09G 3/12; G09G 3/14; G09G 3/32; G09G 3/3208; G09G 3/3233; G09G 3/3258; G09G 3/3291
USPC ..................... 345/76–83, 173–179; 315/169.3
See application file for complete search history.

(56) References Cited

U.S. PATENT DOCUMENTS

2010/0097352 A1* 4/2010 Ahn ...................... G06F 3/0412
345/175
2010/0231528 A1* 9/2010 Wolfe ................... G06F 3/0412
345/173
(Continued)

FOREIGN PATENT DOCUMENTS

CN 103135846 A 6/2013
CN 103218972 A 7/2013
(Continued)

OTHER PUBLICATIONS

English Translation of the International Search Report of PCT/CN2014/077615 published in English on Feb. 5, 2015.
(Continued)

*Primary Examiner* — Alexander Eisen
*Assistant Examiner* — Nelson Lam
(74) *Attorney, Agent, or Firm* — Collard & Roe, P.C.

(57) ABSTRACT

A pixel circuit, an organic electroluminescent display panel and a display device are provided. The pixel circuit includes a luminous device (D1), a photosensitive device (P1), a drive control sub-module (1), a data write sub-module (2), a light-emitting control sub-module (3) and a touch detection sub-module (4). Upon the data write sub-module (2) being turned on, a data signal at the data signal terminal (Data) is transmitted to the drive control sub-module (1) by the data write sub-module (2). Upon the light-emitting control sub-module (3) being turned on, the light-emitting control sub-module (3) controls the drive control sub-module (1) to drive the luminous device (D1) to give off light, so as to achieve a display function. Upon the touch detection sub-module (4) being turned on, the touch detection sub-module (4) controls output of a touch detection signal from the drive control sub-module (1) to a touch signal read terminal. The touch detection signal is decreased as the light intensity irradiated onto the photosensitive device is increased, so as to achieve a touch detecting function. Touch and display functions are integrated in the pixel circuit, so that the production cost involved in arranging a display drive circuit and a touch circuit separately can be saved, and thickness of the display panel can be thinned as well.

20 Claims, 7 Drawing Sheets

(52) U.S. Cl.
CPC ............... *G09G 2300/0426* (2013.01); *G09G 2300/0819* (2013.01); *G09G 2300/0842* (2013.01); *G09G 2300/0861* (2013.01); *G09G 2320/0233* (2013.01); *G09G 2320/0295* (2013.01); *G09G 2360/148* (2013.01)

(56) References Cited

U.S. PATENT DOCUMENTS

| | | | |
|---|---|---|---|
| 2013/0009942 A1 | 1/2013 | Lee et al. | |
| 2013/0201085 A1* | 8/2013 | Chang | G09G 3/3258 345/76 |
| 2013/0321292 A1* | 12/2013 | Jeon | G06F 3/0412 345/173 |
| 2014/0168127 A1 | 6/2014 | Yang | |
| 2015/0002414 A1* | 1/2015 | Tan | G06F 3/0412 345/173 |
| 2015/0035798 A1* | 2/2015 | Zhou | G09G 3/3266 345/174 |
| 2015/0049046 A1* | 2/2015 | Tan | G06F 3/0412 345/174 |
| 2015/0103037 A1* | 4/2015 | Wu | G09G 3/3233 345/174 |
| 2015/0193045 A1* | 7/2015 | Zhou | G09G 3/3233 345/174 |
| 2015/0205429 A1* | 7/2015 | Nie | G06F 3/0416 345/175 |
| 2015/0220186 A1* | 8/2015 | Tan | G06F 3/0412 345/174 |
| 2015/0268763 A1* | 9/2015 | Zhou | G06F 3/0412 345/174 |
| 2015/0301674 A1* | 10/2015 | Tan | G06F 3/042 345/173 |
| 2015/0302801 A1* | 10/2015 | Tan | G06F 3/042 345/173 |
| 2015/0325171 A1* | 11/2015 | Zhou | G09G 3/3233 345/80 |
| 2016/0041676 A1* | 2/2016 | Tan | G06F 3/0416 345/173 |

FOREIGN PATENT DOCUMENTS

| | | |
|---|---|---|
| CN | 103413522 A | 11/2013 |
| CN | 203366704 U | 12/2013 |
| EP | 2 328 178 A2 | 6/2011 |
| JP | 2010085526 A | 4/2010 |

OTHER PUBLICATIONS

International Search Report and Written Opinion of the International Searching Authority with Notice of Transmittal of the International Search Report and Written Opinion of PCT/CN2014/077615 in Chinese, mailed Aug. 27, 2014.

Written Opinion of the International Searching Authority of PCT/CN2014/077615 in Chinese with English translation, mailed Aug. 27, 2014.

* cited by examiner

PIXEL CIRCUIT, ORGANIC ELECTROLUMINESCENT DISPLAY PANEL AND DISPLAY DEVICE

CROSS REFERENCE TO RELATED APPLICATIONS

This application is the National Stage of PCT/CN2014/077615 filed on May 15, 2014, which claims priority under 35 U.S.C. §119 of Chinese Application No.201310329790.3 filed on Jul. 31, 2013, the disclosure of which is incorporated by reference.

Embodiments of the present invention relate to a pixel circuit, an organic electroluminescent display panel and a display device.

BACKGROUND

As the display devices are developing in the direction of lightness and thinness, high resolution, intellectualization, and energy-saving, the use of touch screen panels is wider and wider. Currently, an In Cell touch panel gets the favors of the major panel manufacturers, and this is because that touch components are embedded inside a display panel, so that the overall thickness of the module can be decreased, and the production cost of the touch panel can be greatly reduced as well. While an Organic Light Emitting Diode (OLED) display panel attracts a lot of attentions by virtue of its advantages of low power consumption, high brightness, low cost, wide viewing angle, fast response speed and so on.

In existing in-cell touch panel OLED display panels, circuits used to realize the display drive and the touch drive for them are separately designed in general. Namely, a set of circuits is used for realization of a touch function, and another set of circuits is used for realization of a display driving function of the OLED. But, separate arrangement of a display drive circuit and a touch circuit will suffer in the drawbacks of higher production cost, heavier display screen and being thicker.

SUMMARY

According to an embodiment of the present invention, there is provided a pixel circuit, comprising: a luminous device, a photosensitive device, a drive control sub-module, a data write sub-module, a light-emitting control sub-module and a touch detection sub-module; wherein, a first terminal of the drive control sub-module is connected to a first terminal of the data write sub-module and a first terminal of the photosensitive device, respectively, a second terminal of the drive control sub-module is connected to a first terminal of the luminous device and a second terminal of the data write sub-module, respectively, a third terminal of the drive control sub-module is connected to a first terminal of the light-emitting control sub-module and a first terminal of the touch detection sub-module, respectively;

a third terminal of the data write sub-module is connected to a data signal terminal, a fourth terminal of the data write sub-module is connected to a scan signal terminal, a fifth terminal of the data write sub-module is connected to a first reference signal terminal, a second terminal of the luminous device and a second terminal of the light-emitting control sub-module, respectively, a sixth terminal of the data write sub-module is connected to a third terminal of the light-emitting control sub-module; under the control of the scan signal terminal, a data signal at the data signal terminal is transmitted to the drive control sub-module by the data write sub-module;

a fourth terminal of the light-emitting control sub-module is connected to a second reference signal terminal and a second terminal of the touch detection sub-module, respectively, a fifth terminal of the light-emitting control sub-module is connected to a light-emitting control signal terminal; under the control of the light-emitting control signal terminal, the light-emitting control sub-module controls the drive control sub-module to drive the luminous device to give off light;

a third terminal of the touch detection sub-module is connected to a second terminal of the photosensitive device, a fourth terminal of the touch detection sub-module is connected to a touch signal read terminal, a fifth terminal of the touch detection sub-module is connected to a touch control signal terminal; under the control of the touch control signal terminal, the touch detection sub-module controls output of a touch detection signal from the drive control sub-module to the touch signal read terminal, the touch detection signal being decreased as the light intensity irradiated onto the photosensitive device is increased.

An organic electroluminescent display panel provided by an embodiment of the invention comprises the pixel circuit provided by embodiments of the invention.

A display device provided by an embodiment of the invention comprises the organic electroluminescent display panel provided by embodiments of the invention.

Beneficial effects of embodiments of the invention comprises:

With respect to a pixel circuit, an organic electroluminescent display panel and a display device provided by embodiments of the invention, the pixel circuit comprises a luminous device, a photosensitive device, a drive control sub-module, a data write sub-module, a light-emitting control sub-module and a touch detection sub-module; wherein, a first terminal of the drive control sub-module is connected to a first terminal of the data write sub-module and a first terminal of the photosensitive device, respectively, its second terminal is connected to a first terminal of the luminous device and a second terminal of the data write sub-module, its third terminal is connected to a first terminal of the light-emitting control sub-module and a first terminal of the touch detection sub-module; a third terminal of the data write sub-module is connected to a data signal terminal, its fourth terminal is connected to a scan signal terminal, its fifth terminal is connected to a first reference signal terminal, a second terminal of the luminous device and a second terminal of the light-emitting control sub-module, respectively, its sixth terminal is connected to a third terminal of the light-emitting control sub-module; a fourth terminal of the light-emitting control sub-module is connected to a second reference signal terminal and a second terminal of the touch detection sub-module, respectively, a fifth terminal of the light-emitting control sub-module is connected to a light-emitting control signal terminal; a third terminal of the touch detection sub-module is connected to a second terminal of the photosensitive device, a fourth terminal of the touch detection sub-module is connected to a touch signal read terminal, a fifth terminal of the touch detection sub-module is connected to a touch control signal terminal. Upon the data write sub-module being turned on, a data signal at the data signal terminal is transmitted to the drive control sub-module by the data write sub-module; upon the light-emitting control sub-module being turned on, the light-emitting control sub-module controls the drive control sub-module to drive the luminous device to give off light, so as to achieve a display function; and upon the touch detection sub-module being turned on, the touch detection sub-module controls output of a touch detection signal from the drive control sub-module to a touch signal read terminal. The touch detection signal is decreased as the light intensity irradiated onto the photosensitive device is increased, so as to achieve a touch detecting function. Touch and display functions are integrated in the pixel circuit, so that the production cost involved in arranging a display drive circuit and a touch circuit separately can be saved, and thickness of the display panel can be thinned as well.

BRIEF DESCRIPTION OF THE DRAWINGS

In order to illustrate the technical solution of the embodiments of the invention more clearly, the drawings of the embodiments will be briefly described below; it is obvious that the drawings as described below are only related to some embodiments of the invention, but not limitative of the invention.

DETAILED DESCRIPTION

In order to make objects, technical details and advantages of the embodiments of the invention apparent, hereinafter, the technical solutions of the embodiments of the invention will be described in a clearly and fully understandable way in connection with the drawings related to the embodiments of the invention. It is obvious that the described embodiments are just a part but not all of the embodiments of the invention. Based on the described embodiments of the invention, those ordinarily skilled in the art can obtain other embodiment(s), without any inventive work, which should be within the scope sought for protection by the invention.

Figure 1:
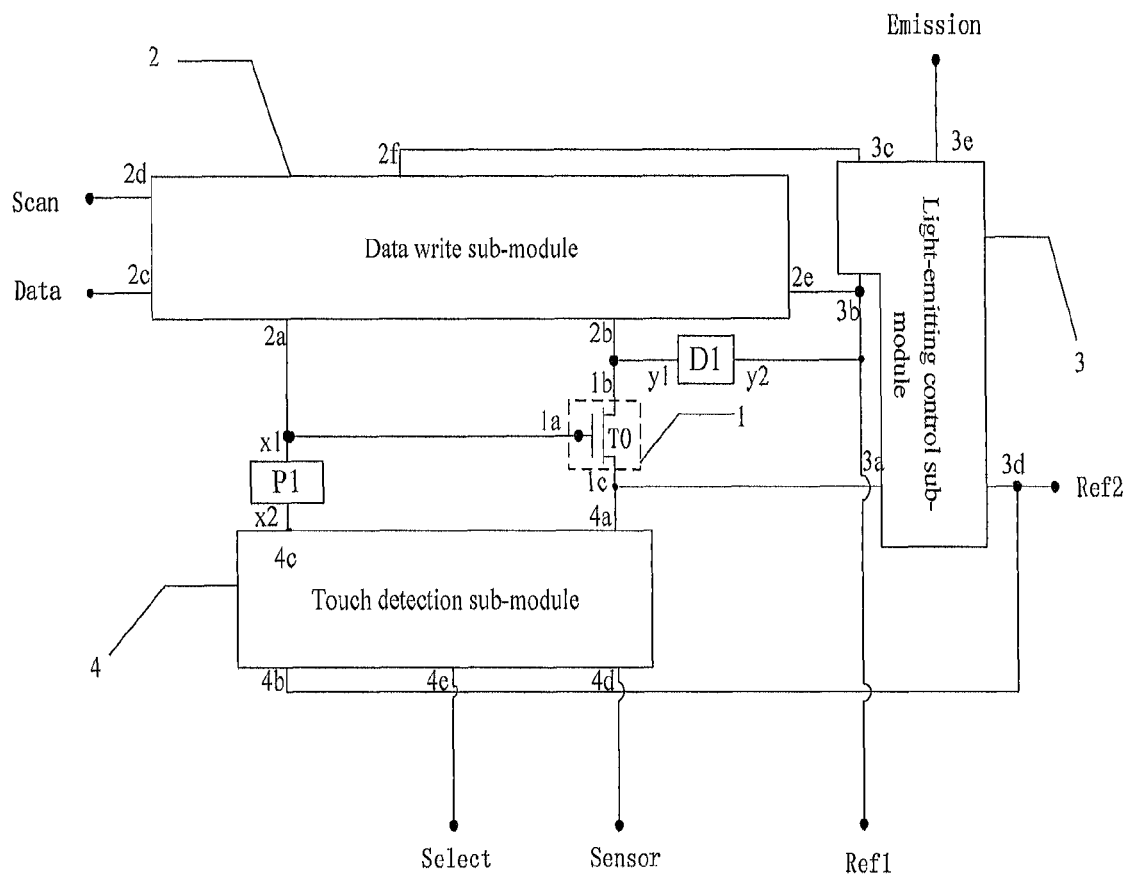
FIG. 1 is a structurally schematic view illustrating a pixel circuit provided by an embodiment of the invention.

A pixel circuit provided by an embodiment of the invention, as illustrated in FIG. 1, comprises a luminous device D1, a photosensitive device P1, a drive control sub-module 1, a data write sub-module 2, a light-emitting control sub-module 3 and a touch detection sub-module 4.

A first terminal 1a of the drive control sub-module 1 is connected to a first terminal 2a of the data write sub-module 2 and a first terminal x1 of the photosensitive device P1, respectively, a second terminal 1b of the drive control sub-module 1 is connected to a first terminal y1 of the luminous device D1 and a second terminal 2b of the data write sub-module 2, respectively, and a third terminal 1c of the drive control sub-module 1 is connected to a first terminal 3a of the light-emitting control sub-module 3 and a first terminal 4a of the touch detection sub-module 4, respectively.

A third terminal 2c of the data write sub-module 2 is connected to a data signal terminal Data, a fourth terminal 2d of the data write sub-module 2 is connected to a scan signal terminal Scan, a fifth terminal 2e of the data write sub-module 2 is connected to a first reference signal terminal Ref1, a second terminal y2 of the luminous device D1 and a second terminal 3b of the light-emitting control sub-module 3, respectively, and a sixth terminal 2f of the data write sub-module 2 is connected to a third terminal 3c of the light-emitting control sub-module 3. Under the control of the scan signal terminal Scan, a data signal of the data signal terminal Data is transmitted to the drive control sub-module 1 by the data write sub-module 2.

A fourth terminal 3d of the light-emitting control sub-module 3 is connected to a second reference signal terminal Ref2 and a second terminal 4b of the touch detection sub-module 4, respectively, a fifth terminal 3e of the light-emitting control sub-module 3 is connected to a light-emitting control signal terminal Emission; under the control of the light-emitting control signal terminal Emission, light-emitting control sub-module 3 controls the drive control sub-module to drive the luminous device D1 to give off light.

A third terminal 4c of the touch detection sub-module 4 is connected to a second terminal x2 of the photosensitive device P1, a fourth terminal 4d of the touch detection sub-module 4 is connected to a touch signal read terminal Sensor, and a fifth terminal 4e of the touch detection sub-module 4 is connected to a touch control signal terminal Select. Under the control of the touch control signal terminal Select, touch detection sub-module 4 takes control of output of a touch detection signal from the drive control sub-module 1 to the touch signal read terminal Sensor, and the touch detection signal is decreased as the light intensity irradiated onto the photosensitive device P1 is increased.

The above pixel circuit provided by an embodiment of the invention comprises a luminous device D1, a photosensitive device P1, a drive control sub-module 1, a data write sub-module 2, a light-emitting control sub-module 3 and a touch detection sub-module 4. Upon the data write sub-module 2 being turned on, a data signal at the data signal terminal Data is transmitted to the drive control sub-module 1 from the data write sub-module 2; upon the light-emitting control sub-module 3 being turned on, the light-emitting control sub-module 3 controls the drive control sub-module 1 to drive the luminous device D1 to give off light, so as to achieve a display function; upon the touch detection sub-module 4 being turned on, the touch detection sub-module 4 takes control of output of a touch detection signal from the drive control sub-module 1 to the touch signal read terminal Sensor. The touch detection signal is decreased as the light intensity irradiated onto the photosensitive device P1 is increased, so as to achieve a touch detecting function. Touch and display functions are integrated into the pixel circuit, and as such, the production cost involved in arranging a display drive circuit and a touch drive circuit separately can be saved, and thickness of the display panel can be thinned as well.

For example, in the above pixel circuit provided by embodiments of the invention, the first terminal 1a and the second terminal 1b of the drive control sub-module 1 are signal input terminals, and the third terminal 1c of the drive control sub-module 1 is a signal output terminal;

the first terminal 2a and the second terminal 2b of the data write sub-module 2 are signal output terminals, and the third terminal 2c, the fourth terminal 2d, the fifth terminal 2e and the sixth terminal 2f of the data write sub-module 2 are signal input terminals;

the first terminal 3a, the second terminal 3b and the fifth terminal 3e of the light-emitting control sub-module 3 are signal input terminals, and the third terminal 3c and the fourth terminal 3d of the light-emitting control sub-module 3 are signal output terminals;

the first terminal 4a and the fifth terminal 4e of the touch detection sub-module 4 are signal input terminals, the fourth terminal 4d of the touch detection sub-module 4 is a signal output terminal; the second terminal 4b of the touch detection sub-module 4 is a signal input terminal, and the third terminal 4c is a signal output terminal, or, the second terminal 4b of the touch detection sub-module 4 is a signal output terminal, and the third terminal 4c is a signal input terminal.

For example, the drive control sub-module 1 in the above pixel circuit provided by embodiments of the invention may comprise a drive transistor T0. As illustrated in FIG. 1, a gate electrode of the drive transistor T0 is the first terminal 1a of the drive control sub-module 1, a drain electrode of the drive transistor T0 is the second terminal 1b of the drive control sub-module 1, and a source electrode of the drive transistor T0 is the third terminal 1c of the drive control sub-module 1. Of course, the drive control sub-module 1 may also be other structure with which the drive control function of it can be realized, and no limit will be set here.

For example, the luminous device D1 in the above pixel circuit provided by embodiments of the invention is usually an organic light emitting diode (OLED). The luminous display is achieved by the luminous device D1 under the action of an on-state current of the drive transistor T0. Specifically, the signal at the first reference signal terminal Ref1 is a high-level direct current signal, the signal at the second reference signal terminal Ref2 is a low-level direct current signal, and a positive electrode of the OLED is connected to the first reference signal terminal Ref1.

For example, the operation of the above pixel circuit provided by embodiments of the invention is divided into two periods: touch and display periods. Upon the above pixel circuit being in operation, it is possible that the operation at the touch period is executed firstly, and then the operation at the display period is executed. It may also be possible that the operation at the display period is executed firstly, and then the operation at the touch period is executed. No limit will be set here.

The working principle of the touch period and the display period of the above pixel circuit provided by embodiments of the invention will be introduced below briefly.

At the touch period, the operation of the above pixel circuit is concretely divided into two stages:

A first stage: a data write stage, in which, data write to a gate electrode of the drive transistor T0 is achieved by the pixel circuit. At this stage, the light-emitting control sub-module 3 and the touch detection sub-module 4 are in a turned-off state, the data write sub-module 2 is in a turned-on state, and a data signal output from the data signal terminal Data is applied to the gate electrode of the drive transistor T0 by the data write sub-module 2.

A second stage: a touch detection stage, in which, the data write sub-module 2 and the light-emitting control sub-module 3 are in a turned-off state, the touch detection sub-module 4 is in a turned-on state, the first terminal x1 of the switched-on photosensitive device P1 is connected to the gate electrode of the drive transistor T0, and the touch detection sub-module 4 takes control of output of a touch detection signal from the drive transistor T0 to the touch signal read terminal Sensor. The touch detection signal is decreased as the light intensity irradiated onto the photosensitive device P1 is increased, so as to achieve detection of a touch.

At the display period, the operation of the above pixel circuit is also divided into two stages:

A first stage: a data write stage, in which, data write to a gate electrode of the drive transistor T0 is achieved by the pixel circuit. At this stage, the light-emitting control sub-module 3 and the touch detection sub-module 4 are in a turned-off state, the data write sub-module 2 is in a turned-on state, and a data signal output from the data signal terminal Data is applied to the gate electrode of the drive transistor T0 by the data write sub-module 2.

A second stage: a light-emitting drive stage, in which, the data write sub-module 2 and the touch detection sub-module 4 are in a turned-off state, the light-emitting control sub-module 3 is in a turned-on state, a first terminal y1 of the luminous device D1 is connected to a drain electrode of the drive transistor T0, and the light-emitting control sub-module 3 controls the drive control sub-module 1 to drive the luminous device D1 to give off light, so as to achieve a display function.

Hereinafter, the concrete structure and the working principle of the data write sub-module 2, the light-emitting control sub-module 3 and the touch detection sub-module 4 in the above pixel circuit provided by embodiments of the invention will be described in detail.

For example, in a pixel circuit provided by an embodiment of the invention, the data write sub-module 2, as illustrated in FIG. 2a to FIG. 2d, may comprise a first switch transistor T1, a second switch transistor T2, a third switch transistor T3 and a capacitor Cst.

Figure 2A:
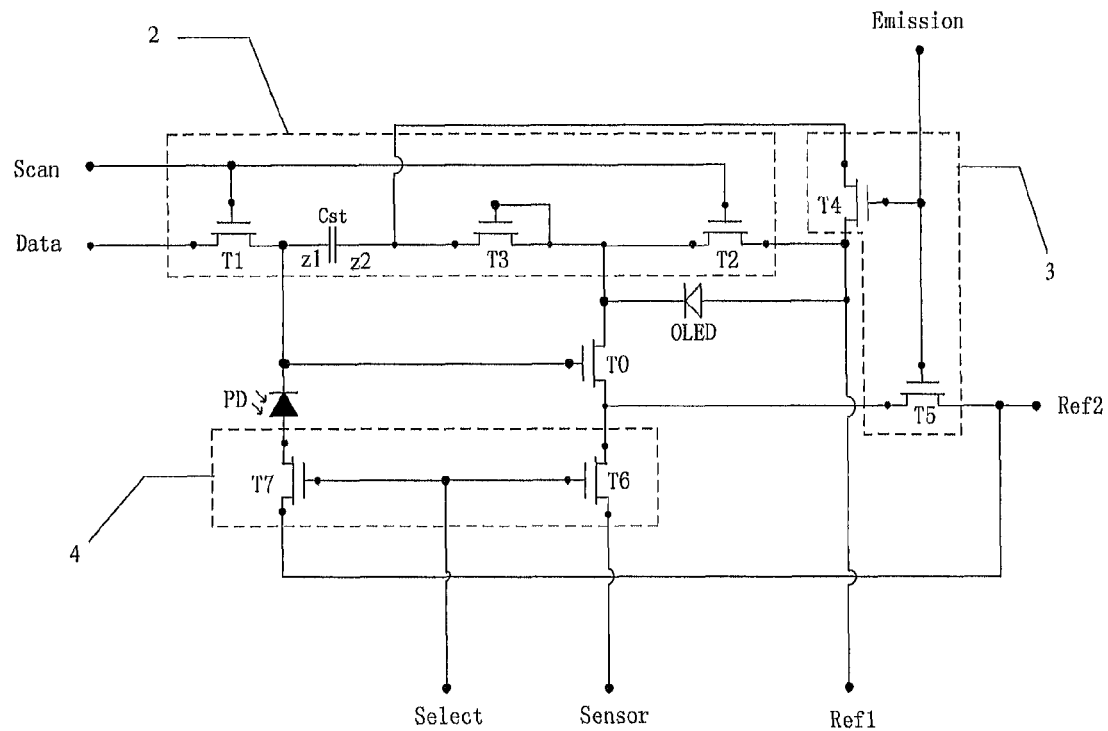
FIG. 2a to FIG. 2d are structurally schematic views respectively illustrating a pixel circuit provided by an embodiment of the invention.
Figure 2B:
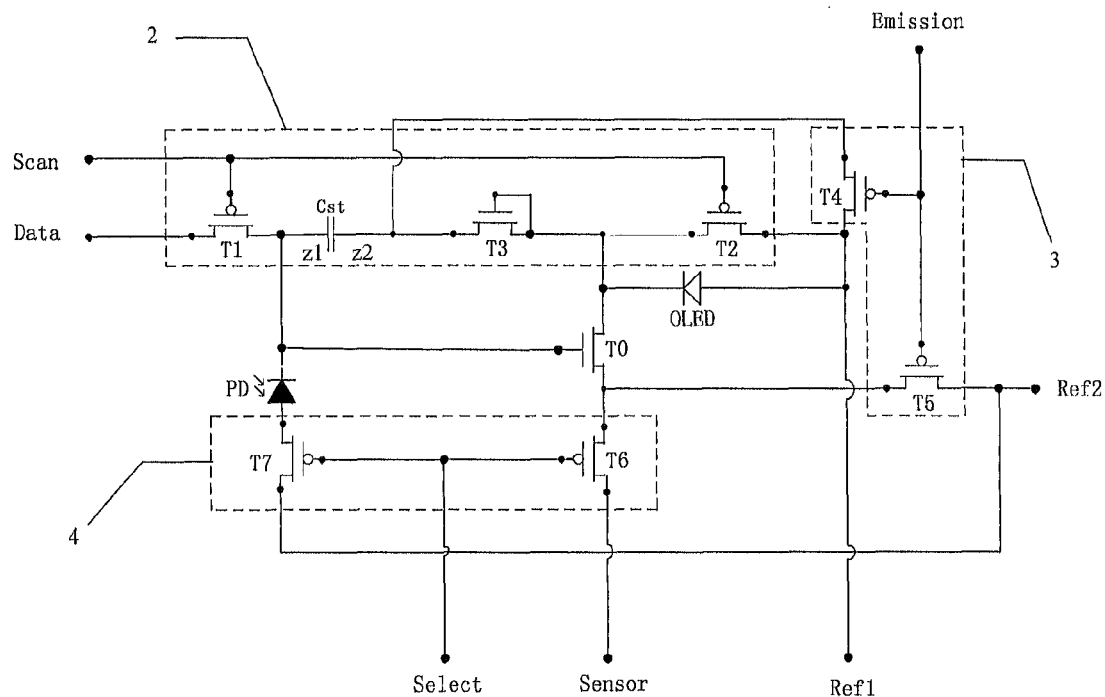
Figure 2C:
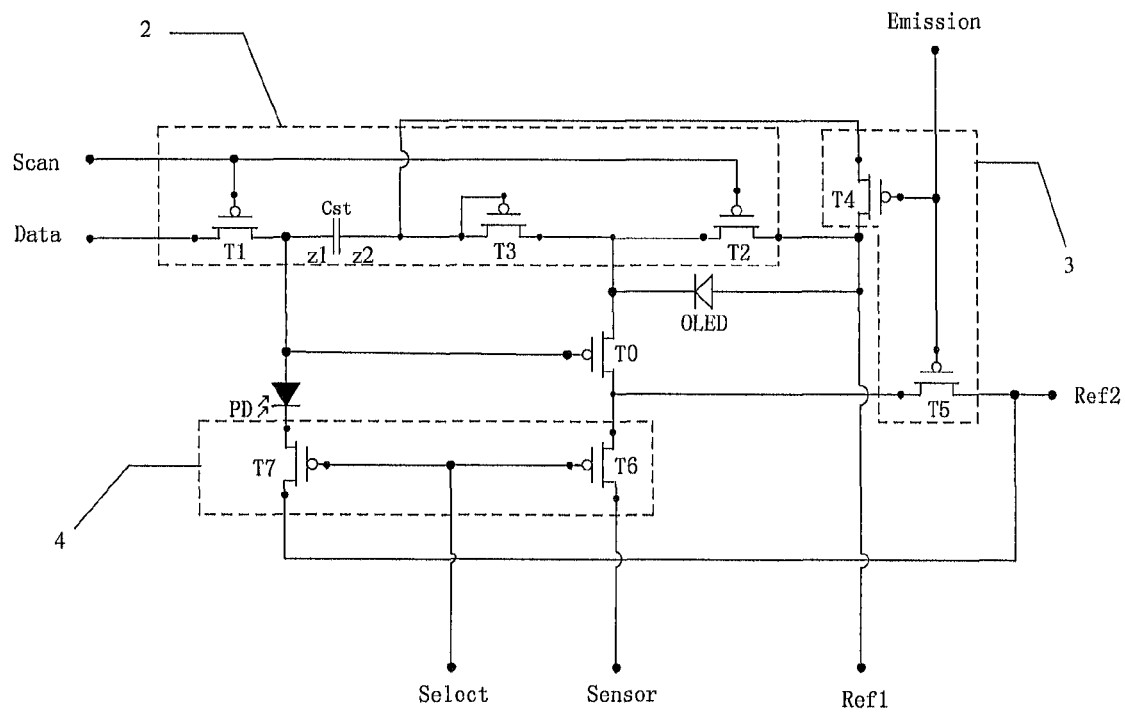
Figure 2D:
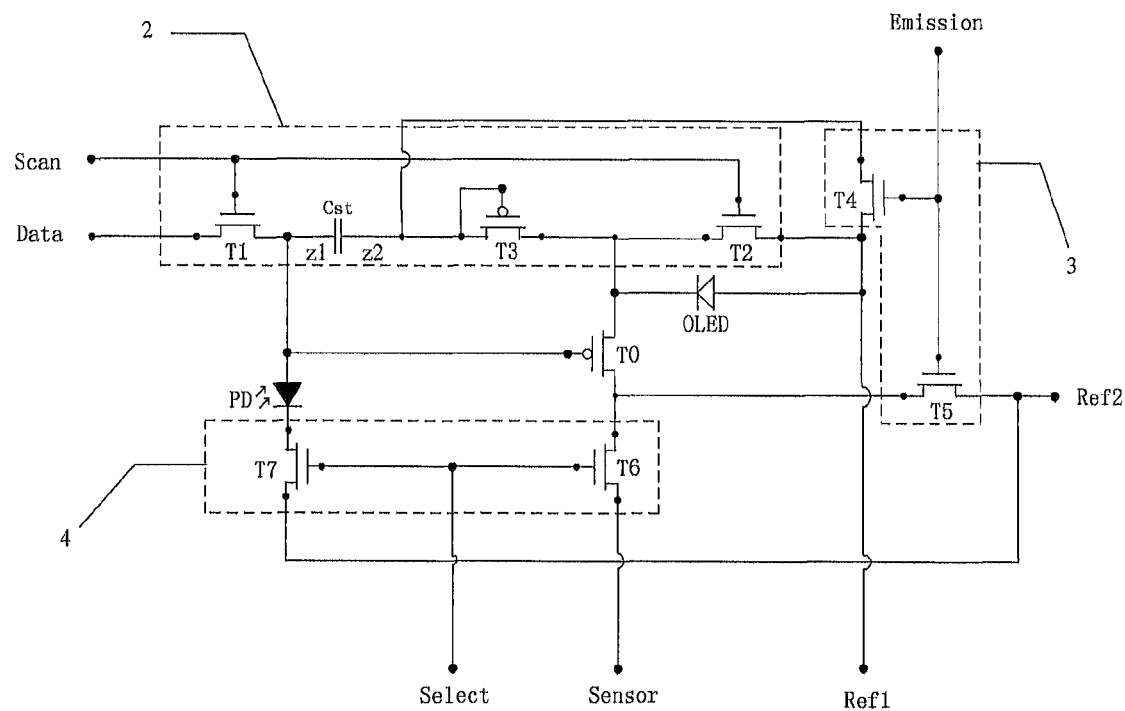

A gate electrode of the first switch transistor T1 is connected to a scan signal terminal Scan, a source electrode of the first switch transistor T1 is connected to a data signal terminal Data, and a drain electrode of the first switch transistor T1 is connected to a gate electrode of a drive transistor T0 and a first end Z1 of the capacitor Cst, respectively;

A gate electrode of the second switch transistor T2 is connected to the scan signal terminal Scan, a source electrode of the second switch transistor T2 is connected to a first reference signal terminal Ref1, and a drain electrode of the second switch transistor T2 is connected to a drain electrode of the drive transistor T0;

Upon the third switch transistor T3 being a N-type transistor, as illustrated in FIG. 2a and FIG. 2b, a gate electrode and a source electrode of the third switch transistor T3 are connected to the drain electrode of the drive transistor T0, respectively, and a drain electrode of the third switch transistor T3 is connected to a second end z2 of the capacitor; upon the third switch transistor T3 being a P-type transistor, as illustrated in FIG. 2c and FIG. 2d, a gate electrode and a source electrode of the third switch transistor T3 are connected to a second end z2 of the capacitor, respectively, a drain electrode of the third switch transistor T3 is connected to the drain electrode of the drive transistor T0. In the above pixel circuit, the gate electrode and the source electrode of the third switch transistor T3 are connected to each other, and its purpose is to make the third switch transistor T3 constitute a diode structure, and as compared with the direct use of a diode, components of the third switch transistor T3 functioning as a diode may be fabricated in the same layers as components of other switch transistors in the pixel circuit. As such, it is possible that the manufacturing process is simplified, and the production cost is reduced.

It is to be noted that, upon concrete implementation, the first switch transistor T1 and the second switch transistor T2 may be P-type transistors, and may also be N-type transistors, and no limit will be set here. In the event that the first switch transistor T1 and the second switch transistor T2 are N-type transistors, the first switch transistor T1 and the second switch transistor T2 can be turned on only when a scan signal of a high level is output from the scan signal terminal Scan; in the event that the first switch transistor T1 and the second switch transistor T2 are P-type transistors, the first switch transistor T1 and the second switch transistor T2 can be turned on only when a scan signal of a low level is output from the scan signal terminal Scan.

For example, in the above pixel circuit provided by embodiments of the invention, threshold voltages of the third switch transistor T3 and the drive transistor T0 may be the same with each other, namely, the third switch transistor T3 and the drive transistor T0 may be N-type transistors simultaneously, and the third switch transistor T3 and the drive transistor T0 have the same structure; or, the third switch transistor T3 and the drive transistor T0 may be P-type transistors simultaneously, and the third switch transistor T3 and the drive transistor T0 have the same structure.

It is to be noted that, for example, in the above pixel circuit provided by embodiments of the invention, upon the third switch transistor T3 and the drive transistor T0 being N-type transistors, their threshold voltages Vth have positive values, and the data signal to the data signal terminal Data at the data write period should be a high-level signal; upon the third switch transistor T3 and the drive transistor T0 are P-type transistors, their threshold voltages Vth have negative values, and the data signal to the data signal terminal Data at the data write period should be a low-level signal.

For example, as for the pixel circuit provided by embodiments of the invention, as illustrated in FIG. 2a to FIG. 2d, the photosensitive device P1 may specifically be a photodiode PD (Photo Diode);

upon the third switch transistor T3 and the drive transistor T0 being N-type transistors, as illustrated in FIG. 2a and FIG. 2b, a cathode of the photodiode PD is connected to a gate electrode of the drive transistor T0; upon the third switch transistor T3 and the drive transistor T0 being P-type transistors, as illustrated in FIG. 2c and FIG. 2d, an anode of the photodiode PD is connected to a gate electrode of the drive transistor T0.

For example, in the pixel circuit provided by embodiments of the invention, the light-emitting control sub-module 3, as illustrated in FIG. 2a to FIG. 2d, may comprise a fourth switch transistor T4 and a fifth switch transistor T5; wherein, a gate electrode of the fourth switch transistor T4 is connected to a light-emitting control signal terminal Emission, a source electrode of the fourth switch transistor T4 is connected to a first reference signal terminal Ref1, and a drain electrode of the fourth switch transistor T4 is connected to a second end z2 of the capacitor Cst;

a gate electrode of the fifth switch transistor T5 is connected to the light-emitting control signal terminal Emission, a source electrode of the fifth switch transistor T5 is connected to a third terminal of the drive transistor T0, and a drain electrode of the fifth switch transistor T5 is connected to a second reference signal terminal Ref2.

For example, the fourth switch transistor T4 and the fifth switch transistor T5 may be N-type transistors, as illustrated in FIG. 2a and FIG. 2d; the fourth switch transistor T4 and the fifth switch transistor T5 may also be P-type transistors, as illustrated in FIG. 2b and FIG. 2c. No limitation will be made here.

It is to be noted that, for example, in the event that the fourth switch transistor T4 and the fifth switch transistor T5 are N-type transistors, the fourth switch transistor T4 and the fifth switch transistor T5 can be turned on only when a light-emitting control signal of a high level is output from the light-emitting control signal terminal Emission; in the event that the fourth switch transistor T4 and the fifth switch transistor T5 are P-type transistors, the fourth switch transistor T4 and the fifth switch transistor T5 can be turned on only when a light-emitting control signal of a low level is output from the light-emitting control signal terminal Emission.

For example, in the pixel circuit provided by embodiments of the invention, the touch detection sub-module 4, as illustrated in FIG. 2a to FIG. 2d, may comprise a sixth switch transistor T6 and a seventh switch transistor T7; wherein, a gate electrode of the sixth switch transistor T6 is connected to a touch control signal terminal Select, a source electrode of the sixth switch transistor T6 is connected to a third terminal of the drive control sub-module 1 (i.e., a source electrode of the drive transistor T0), and a drain electrode of the sixth switch transistor T6 is connected to a touch signal read terminal Sensor;

a gate electrode of the seventh switch transistor T7 is connected to the touch control signal terminal Select, a source electrode of the seventh switch transistor T7 is connected to a second terminal of the photosensitive device P1, and a drain electrode of the seventh switch transistor T7 is connected to a second reference signal terminal Ref2.

For example, the sixth switch transistor T6 and the seventh switch transistor T7 may be N-type transistors, as illustrated in FIG. 2a and FIG. 2d; the sixth switch transistor T6 and the seventh switch transistor T7 may also be P-type transistors, as illustrated in FIG. 2b and FIG. 2e. No limitation will be made here.

It is to be noted that, for example, in the event that the sixth switch transistor T6 and the seventh switch transistor T7 are N-type transistors, the sixth switch transistor T6 and the seventh switch transistor T7 can be turned on only when a touch control signal of a high level is output from the touch control signal terminal Select; in the event that the sixth switch transistor T6 and the seventh switch transistor T7 are P-type transistors, the sixth switch transistor T6 and the seventh switch transistor T7 can be turned on only when a touch control signal of a low level is output from the touch control signal terminal Select.

It is to be noted that, in the pixel circuit provided by embodiments of the invention, the mentioned drive transistor and switch transistors may be thin film transistors (TFTs), and may also be metal oxide semiconductor (MOS) transistor, no limit being set here. And, source electrodes and drain electrodes of these transistors may be interchanged, and no specific discrimination will be made.

The specific working principle of the above pixel circuit provided by embodiments of the invention will be described below in detail with the aid of several concrete examples. In the following examples, the voltage value of the first reference signal terminal Ref1 is a high level ($V_{DD}$), and the voltage value of the second reference signal terminal Ref2 is a low level ($V_{SS}$), usually being zero volts.

EXAMPLE 1

As illustrated in FIG. 2a, the drive transistor T0 and the third transistor T3 are N-type transistors, and the first switch transistor T1, the second switch transistor T2, the fourth switch transistor T4, the fifth switch transistor T5, the sixth switch transistor T6 and the seventh switch transistor T7 are N-type transistors as well.

Figure 3A:
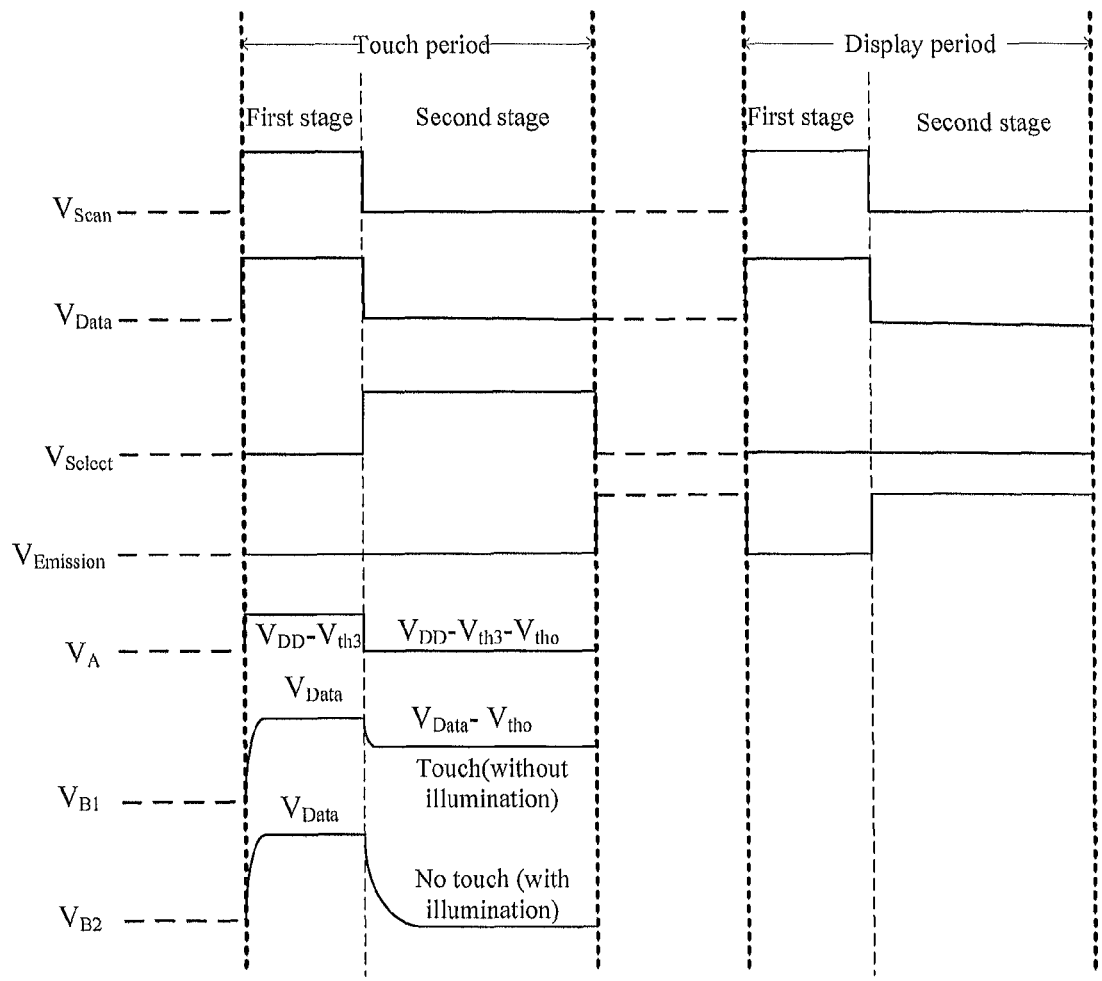
FIG. 3a to FIG. 3d are diagrams respectively illustrating the circuit timing of a pixel circuit provided by an embodiment of the invention.

In a circuit signal timing diagram of the pixel circuit, as illustrated in FIG. 3a, the voltage of the scan signal terminal is $V_{Scan}$, the voltage of the data signal voltage is $V_{Data}$, the voltage of the light-emitting control signal terminal is $V_{Emission}$, the voltage of the touch control signal terminal is $V_{Select}$, the voltage of the second end of the capacitor is $V_A$, the voltage of the gate electrode of the drive transistor T0 in the case of a touch is $V_{B1}$, and the voltage of the gate electrode of the drive transistor T0 in the case of no touch is $V_{B2}$.

The working principle of the pixel circuit is as follows.

At the data write stage of the touch period (i.e. the first stage of the touch period), $V_{Scan}$ of the scan signal terminal and $V_{Data}$ of the data signal terminal are of high level, $V_{Emission}$ of the light-emitting control signal terminal and $V_{Select}$ of touch control signal terminal are of low level, and at this time, the first switch transistor T1 and the second switch transistor T2 are in a turned-on state, the fourth switch transistor T4, the fifth switch transistor T5, the sixth switch transistor T6 and the seventh switch transistor T7 are in a turned-off state, and the OLED is in a short-circuited state. The voltage $V_{DD}$ of the first reference signal terminal Ref1 directly flows into gate and source electrodes of the third switch transistor T3 via the second switch transistor T2, to let the third transistor T3 be in a turned-on state, and is output from the drain electrode of the third transistor T3 to the second end z2 of the capacitor Cst, wherein, the threshold voltage of the third switch transistor is $V_{th3}$, the voltage value $V_A$ of the second end z2 of the capacitor Cst turns to be $V_{DD}-V_{th3}$, thereby achieving storage of the threshold voltage of the third switch transistor at the second end z2 of the capacitor Cst. A data signal $V_{Data}$ output from the data signal terminal Data is written into the first end z1 of the capacitor connected to a drain electrode of the first switch transistor T1 via its source electrode, namely, the voltage of the first end z1 of the capacitor Cst turns into $V_{Data}$, the first end z1 of the capacitor Cst is connected to a gate electrode of the drive transistor T0, and the voltage of the gate electrode of the drive transistor T0 is also $V_{Data}$ (i.e., data write of $V_{Data}$ is realized at the gate electrode of the drive transistor). In this case, the photodiode PD is in a turned-off state, and whether there is a touch on the photodiode PD or not, gate voltages $V_{B1}$ and $V_{B2}$ of the drive transistor T0 are both $V_{Data}$.

At the touch detection stage of the touch period (i.e. the second stage of the touch period), $V_{Select}$ of the touch control signal terminal is of high level, $V_{Scan}$ of the scan of signal terminal, $V_{Data}$ of the data signal terminal and $V_{Emission}$ of the light-emitting control signal terminal are of low level, and at this time, the first switch transistor T1, the second switch transistor T2, the fourth switch transistor T4, and the fifth switch transistor T5 are in a turned-off state, the sixth switch transistor T6 and the seventh switch transistor T7 are in a turned-on state, and the photodiode PD and the second reference signal terminal Ref2 are in a state of being connected. An OLED is turned on transiently, the voltage $V_{DD}$ of the first reference signal terminal Ref1 flows into gate and source electrodes of the third switch transistor T3 via the OLED, to let the third transistor T3 be in a turned-on state, and is output from the drain electrode of the third transistor T3 to the second end z2 of the capacitor Cst, so that the voltage value $V_A$ of the second end z2 of the capacitor Cst turns into $V_{DD}-V_{th3}-V_{th0}$, wherein, $V_{th0}$ is the threshold voltage of the luminous device OLED. Based on the principle of conservation of capacitance charge, the voltage of the first end z1 of the capacitor turns into $V_{DD}-V_{th3}-V_{th0}+(V_{Data}-V_{DD}+V_{th3})=V_{Data}-V_{th0}$ accordingly. At this time, if the photodiode PD is not irradiated with light (namely, there is a touch on it), that is, the photodiode PD is in a turned-off state, then the gate voltage $V_{B1}$ of the drive transistor T0 is maintained at $V_{Data}-V_{th0}$. If the photodiode PD is irradiated with light (namely, there is no touch on it), then photo-induced carriers are generated by the photodiode as a result of photoelectric effect so as to form a photocurrent. The photocurrent will cause the charge on the capacitor Cst to decrease, so that the voltage of the first end z1 of the capacitor is reduced, and in turn, the gate voltage $V_{B2}$ input into the drive transistor T0 is reduced. This brings about the fact that a touch detection signal that is output finally from the drive transistor T0 and is output to a touch signal read terminal Sensor via the sixth switch transistor T6 becomes small. The size of the touch detection signal is related to the light intensity irradiated onto the photodiode, and the greater the light intensity is, the smaller the touch detection signal is.

At the data write stage of the display period (i.e. the first stage of the display period), $V_{Scan}$ of the scan signal terminal and $V_{Data}$ of the data signal terminal are of high level, $V_{Emission}$ of the light-emitting control signal terminal and $V_{Select}$ of touch control signal terminal are of low level, and at this time, the first switch transistor T1 and the second switch transistor T2 are in a turned-on state, the fourth switch transistor T4, the fifth switch transistor T5, the sixth switch transistor T6 and the seventh switch transistor T7 are in a turned-on state, and the OLED is in a short-circuited state. The voltage $V_{DD}$ of the first reference signal terminal Ref1 directly flows into gate and source electrodes of the third switch transistor T3 via the second switch transistor T2, to let the third transistor T3 be in a turned-on state, and is output from the drain electrode of the third transistor T3 to the second end z2 of the capacitor Cst, wherein, the threshold voltage of the third switch transistor is $V_{th3}$, the voltage value $V_A$ of the second end z2 of the capacitor Cst turns to be $V_{DD}-V_{th3}$, thereby achieving storage of the threshold voltage of the third switch transistor at the second end z2 of the capacitor Cst. A data signal $V_{Data}$ output from the data signal terminal Data is written into the first end z1 of the capacitor connected to a drain electrode of the first switch transistor T1 via its source electrode, namely, the voltage of the first end z1 of the capacitor Cst turns into $V_{Data}$, the first end z1 of the capacitor Cst is connected to a gate electrode of the drive transistor T0, and the voltage of the gate electrode of the drive transistor T0 is also $V_{Data}$ (i.e., data write of $V_{Data}$ is realized at the gate electrode of the drive transistor).

At the light-emitting drive stage of the display period (i.e. the second stage of the display period), $V_{Emission}$ of the light-emitting control signal terminal is of high level, $V_{Scan}$ of the scan signal terminal, $V_{Data}$ of the data signal terminal and $V_{Select}$ of the touch control signal terminal are of low level, and at this time, the first switch transistor T1, the second switch transistor T2, the sixth switch transistor T6 and the seventh switch transistor T7 are in a turned-off state, the fourth switch transistor T4 and the fifth switch transistor T5 are in a turned-on state, the third switch transistor T3 is reversely cut off, and an OLED is turned on. The voltage $V_{DD}$ of the first reference signal terminal Ref1 directly flows into a second end z2 of the capacitor Cst via the fourth switch transistor T4, so that the voltage value $V_A$ of the second end z2 of the capacitor Cst turns into $V_{DD}$. Based on the principle of conservation of capacitance charge, the voltage of the first end z1 of the capacitor turns into $V_{DD}+(V_{Data}-V_{DD}+V_{th3})=V_{Data}+V_{th3}$ accordingly. At this time, the voltage between the source electrode and the gate electrode of the drive transistor T0 is $V_{gs}=V_g-V_s=V_{Data}+V_{th3}$.

As the drive transistor T0 operates in a saturated state, it can be known according to current characteristics in the saturated state that, the on-state current $i_d$ of the drive transistor T0 satisfies the formula: $i_d=K(V_{gs}-V_{th})^2=K(V_{Data}+V_{th3}-V_{th0})^2$, where K is a structural parameter, and the value is relatively stable for same structures, so that it can be regarded as a constant. Upon the threshold voltage $V_{th3}$ of the third switch transistor T3 being equal to the threshold voltage $V_{th0}$ of the drive transistor T0, the on-state current $i_d$ of the drive transistor T0 $i_d=K(V_{gs}-V_{th})^2=K(V_{Data}+V_{th3}-V_{th0})^2=(V_{Data})^2$. As can be seen from derivation of the formula, upon the threshold voltage $V_{th3}$ of the third switch transistor T3 being equal to the threshold voltage $V_{th0}$ of the drive transistor T0, a drain current flowing through the drive transistor T0 is merely related to the voltage $V_{Data}$ of a data signal, and has nothing to do with the threshold voltage $V_{th}$ of the drive transistor T0. Therefore, upon the on-state current $i_d$ being useful for driving the luminous device D1 to give off light, the current flowing through each OLED is relatively uniform. There is no such case where the threshold voltage $V_{th}$ is non-uniform owing to the rear panel manufacturing process and this leads to the fact that the current flowing through each OLED differs, resulting in uneven brightness.

EXAMPLE 2

As illustrated in FIG. 2b, the drive transistor T0 and the third transistor T3 are N-type transistors, and the first switch transistor T1, the second switch transistor T2, the fourth switch transistor T4, the fifth switch transistor T5, the sixth switch transistor T6 and the seventh switch transistor T7 are P-type transistors.

Figure 3B:
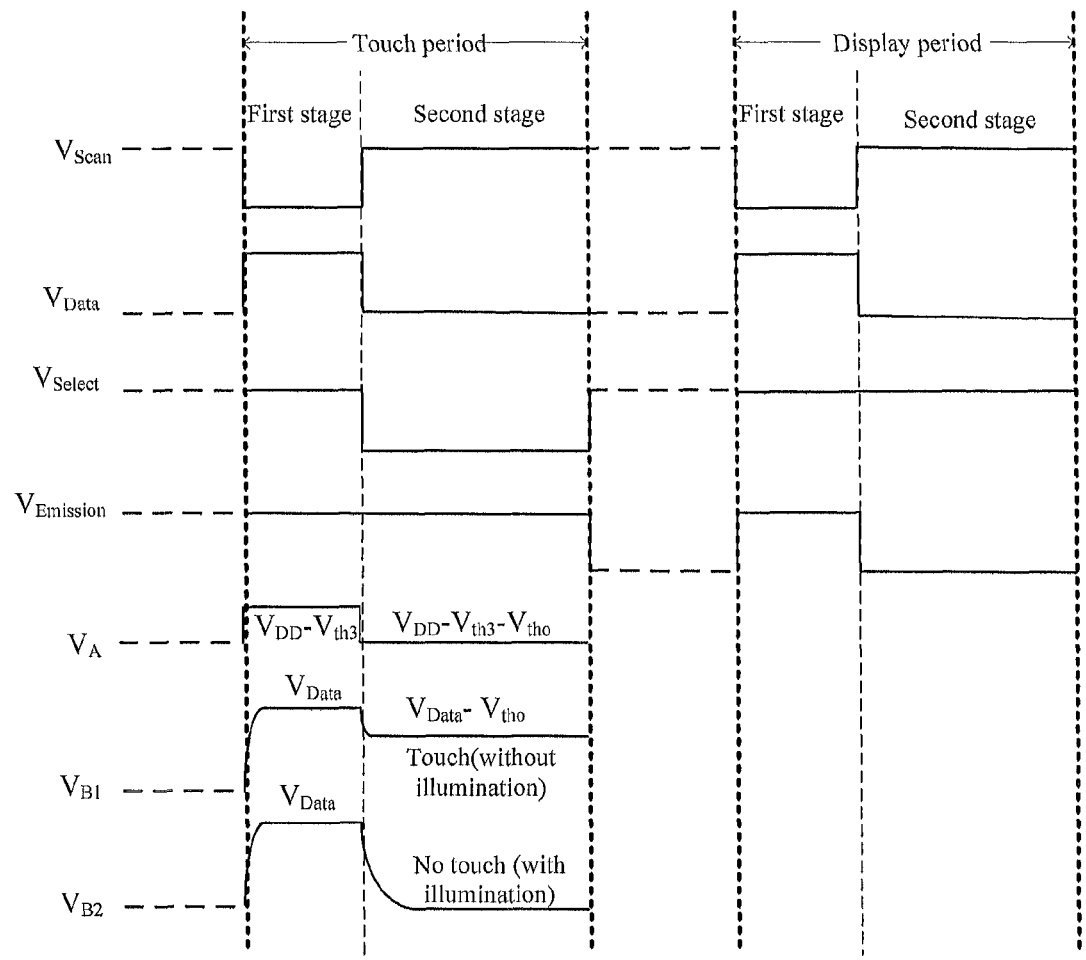

In a circuit signal timing diagram of the pixel circuit, as illustrated in FIG. 3b, the voltage of the scan signal terminal is $V_{Scan}$, the voltage of the data signal terminal is $V_{Data}$, the voltage of the light-emitting control signal terminal is $V_{Emission}$, the voltage of the touch control signal terminal is $V_{Select}$, the voltage of the second terminal of the capacitor is $V_A$, the voltage of the gate electrode of the drive transistor T0 in the case of a touch is $V_{B1}$, and the voltage of the gate electrode of the drive transistor T0 in the case of no touch is $V_{B2}$.

The working principle of the pixel circuit is as follows.

At the data write stage of the touch period (i.e., the first stage of the touch period), $V_{Scan}$ of the scan signal terminal is of low level, $V_{Data}$ of the data signal terminal, $V_{Emission}$ of the light-emitting control signal terminal and $V_{Select}$ of touch control signal terminal are of high level, and at this time, the first switch transistor T1 and the second switch transistor T2 are in a turned-on state, the fourth switch transistor T4, the fifth switch transistor T5, the sixth switch transistor T6 and the seventh switch transistor T7 are in a turned-off state, and the OLED is in a short-circuited state. The voltage $V_{DD}$ of the first reference signal terminal Ref1 directly flows into gate and source electrodes of the third switch transistor T3 via the second switch transistor T2, to let the third transistor T3 be in a turned-on state, and is output from the drain electrode of the third transistor T3 to the second end z2 of the capacitor Cst, wherein, the threshold voltage of the third switch transistor is $V_{th3}$, the voltage value $V_A$ of the second end z2 of the capacitor Cst turns to be $V_{DD}-V_{th3}$, thereby achieving storage of the threshold voltage of the third switch transistor at the second end z2 of the capacitor Cst. A data signal $V_{Data}$ output from the data signal terminal Data is written into the first end z1 of the capacitor connected to a drain electrode of the first switch transistor T1 via its source electrode, namely, the voltage of the first end z1 of the capacitor Cst turns into $V_{Data}$, the first end z1 of the capacitor Cst is connected to a gate electrode of the drive transistor T0, and the voltage of the gate electrode of the drive transistor T0 is also $V_{Data}$ (i.e., data write of $V_{Data}$ is realized at the gate electrode of the drive transistor). In this case, the photodiode PD is in a turned-off state, and whether there is a touch on the photodiode PD or not, gate voltages of the drive transistor T0 are both $V_{Data}$.

At the touch detection stage of the touch period (i.e. the second stage of the touch period), $V_{Select}$ of the touch control signal terminal and $V_{Data}$ of the data signal terminal are of low level, $V_{Scan}$ of the scan signal terminal and $V_{Emission}$ of the light-emitting control signal terminal are of high level, and at this time, the first switch transistor T1, the second switch transistor T2, the fourth switch transistor T4, and the fifth switch transistor T5 are in a turned-off state, the sixth switch transistor T6 and the seventh switch transistor T7 are in a turned-on state, and the photodiode PD and the second reference signal terminal Ref2 are in a state of being connected. An OLED is turned on transiently, the voltage $V_{DD}$ of the first reference signal terminal Ref1 flows into gate and source electrodes of the third switch transistor T3 via the OLED, to let the third transistor T3 be in a turned-on state, and is output from the drain electrode of the third transistor T3 to the second end z2 of the capacitor Cst, so that the voltage value $V_A$ of the second end z2 of the capacitor Cst turns into $V_{DD}-V_{th3}-V_{th0}$, wherein, $V_{th0}$ is the threshold voltage of the luminous device OLED. Based on the principle of conservation of capacitance charge, the voltage of the first end z1 of the capacitor turns into $V_{DD}-V_{th3}-V_{th0}+(V_{Data}-V_{DD}+V_{th3})=V_{Data}-V_{th0}$ accordingly. At this time, if the photodiode PD is not irradiated with light (namely, there is a touch on it), that is, the photodiode PD is in a turned-off state, then the gate voltage $V_{B1}$ of the drive transistor T0 is maintained at $V_{Data}-V_{th0}$. If the photodiode PD is irradiated with light (namely, there is no touch on it), then photo-induced carriers are generated by the photodiode as a result of photoelectric effect so as to form a photocurrent. The photocurrent will cause the charge on the capacitor Cst to decrease, so that the voltage of the first end z1 of the capacitor is reduced, and in turn, the gate voltage $V_{B2}$ input into the drive transistor T0 is reduced. This brings about the fact that a touch detection signal that is output finally from the drive transistor T0 and is output to a touch signal read terminal Sensor via the sixth switch transistor T6 becomes small. The size of the touch detection signal is related to the light intensity irradiated onto the photodiode, and the greater the light intensity is, the smaller the touch detection signal is.

At the data write stage of the display period (i.e. the first stage of the display period), $V_{Scan}$ of the scan signal terminal is of low level, $V_{Data}$ of the data signal terminal, $V_{Emission}$ of the light-emitting control signal terminal and $V_{Select}$ of touch control signal terminal are of high level, and at this time, the first switch transistor T1 and the second switch transistor T2 are in a turned-on state, the fourth switch transistor T4, the fifth switch transistor T5, the sixth switch transistor T6 and the seventh switch transistor T7 are in a turned-on state, and the OLED is in a short-circuited state. The voltage $V_{DD}$ of the first reference signal terminal Ref1 directly flows into gate and source electrodes of the third switch transistor T3 via the second switch transistor T2, to let the third transistor T3 be in a turned-on state, and is output from the drain electrode of the third transistor T3 to the second end z2 of the capacitor Cst, wherein, the threshold voltage of the third switch transistor is $V_{th3}$, the voltage value $V_A$ of the second end z2 of the capacitor Cst turns to be $V_{DD}-V_{th3}$, thereby achieving storage of the threshold voltage of the third switch transistor at the second end z2 of the capacitor Cst. A data signal $V_{Data}$ output from the data signal terminal Data is written into the first end z1 of the capacitor connected to a drain electrode of the first switch transistor T1 via its source electrode, namely, the voltage of the first end z1 of the capacitor Cst turns into $V_{Data}$, the first end z1 of the capacitor Cst is connected to a gate electrode of the drive transistor T0, and the voltage of the gate electrode of the drive transistor T0 is also $V_{Data}$ (i.e., data write of $V_{Data}$ is realized at the gate electrode of the drive transistor).

At the light-emitting drive stage of the display period (i.e. the second stage of the display period), $V_{Emission}$ of the light-emitting control signal terminal and $V_{Data}$ of the data signal terminal are of low level, $V_{Scan}$ of the scan signal terminal and $V_{Select}$ of the touch control signal terminal are of high level, and at this time, the first switch transistor T1, the second switch transistor T2, the sixth switch transistor T6 and the seventh switch transistor T7 are in a turned-off state, the fourth switch transistor T4 and the fifth switch transistor T5 are in a turned-on state, the third switch transistor T3 is reversely cut off, and an OLED is turned on. The voltage $V_{DD}$ of the first reference signal terminal Ref1 directly flows into a second end z2 of the capacitor Cst via the fourth switch transistor T4, so that the voltage value $V_A$ of the second end z2 of the capacitor Cst turns into $V_{DD}$. Based on the principle of conservation of capacitance charge, the voltage of the first end z1 of the capacitor turns into $V_{DD}+(V_{Data}-V_{DD}+V_{th3})= V_{Data}+V_{th3}$ accordingly. At this time, the voltage between the source electrode and the gate electrode of the drive transistor T0 is $V_{gs}=V_g-V_s=V_{Data}+V_{th3}$.

As the drive transistor T0 operates in a saturated state, it can be known according to current characteristics in the saturated state that, the on-state current $i_d$ of the drive transistor T0 satisfies the formula: $i_d=K(V_{gs}-V_{th})^2=K(V_{Data}+V_{th3}-V_{th0})^2$, where K is a structural parameter, and the value is relatively stable for same structures, so that it can be regarded as a constant. Upon the threshold voltage $V_{th3}$ of the third switch transistor T3 being equal to the threshold voltage $V_{th0}$ of the drive transistor T0, the on-state current $i_d$ of the drive transistor T0 $i_d=K(V_{gs}-V_{th})^2=K(V_{Data}+V_{th3}-V_{th0})^2=(V_{Data})^2$. As can be seen from derivation of the formula, upon the threshold voltage $V_{th3}$ of the third switch transistor T3 being equal to the threshold voltage $V_{th0}$ of the drive transistor T0, a drain current flowing through the drive transistor T0 is merely related to the voltage $V_{Data}$ of a data signal, and has nothing to do with the threshold voltage $V_{th}$ of the drive transistor T0. Therefore, upon the on-state current $i_d$ being useful for driving the luminous device D1 to give off light, the current flowing through each OLED is relatively uniform. There is no such case where the threshold voltage $V_{th}$ is non-uniform owing to the rear panel manufacturing process and this leads to the fact that the current flowing through each OLED differs, resulting in uneven brightness.

EXAMPLE 3

As illustrated in FIG. 2c, the drive transistor T0 and the third transistor T3 are P-type transistors, and the first switch transistor T1, the second switch transistor T2, the fourth switch transistor T4, the fifth switch transistor T5, the sixth switch transistor T6 and the seventh switch transistor T7 are P-type transistors as well.

Figure 3C:
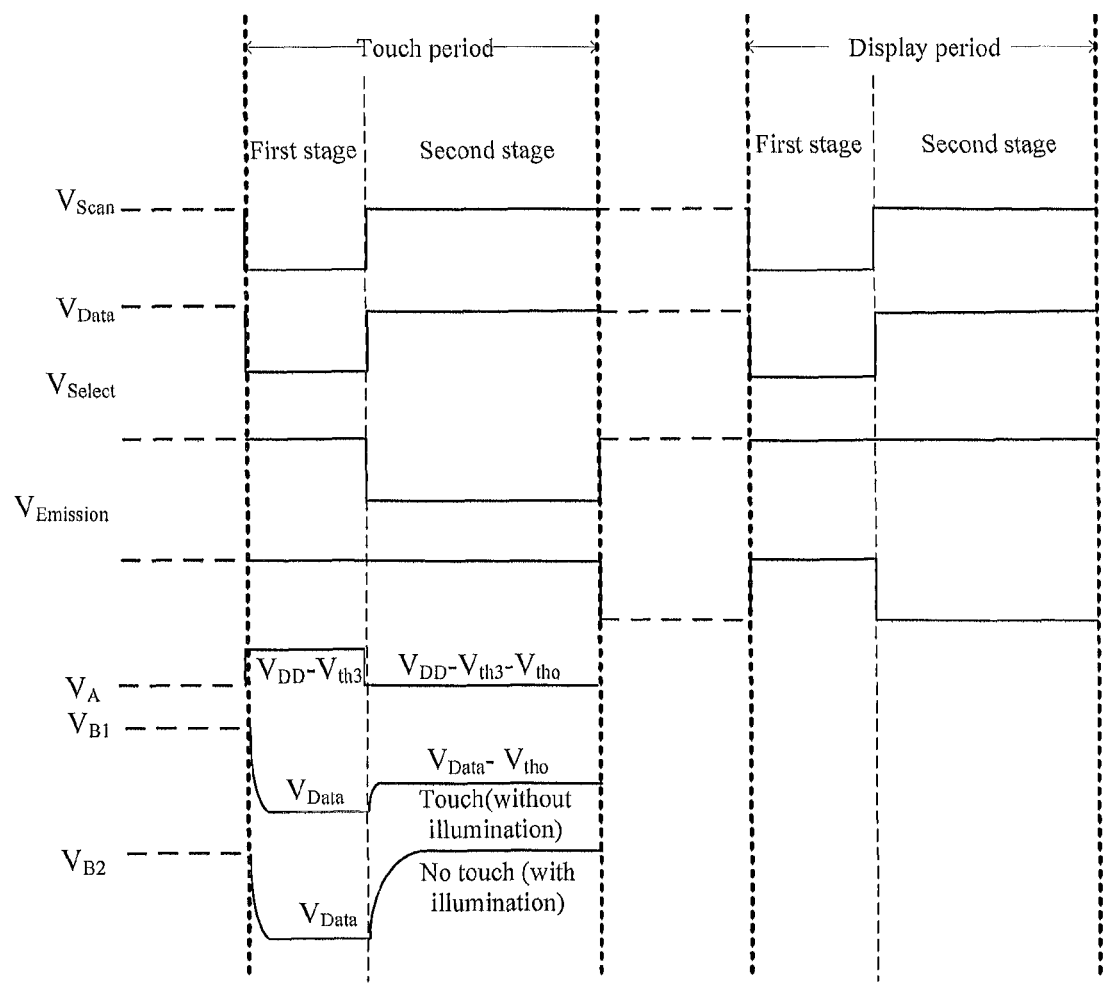

In a circuit signal timing diagram of the pixel circuit, as illustrated in FIG. 3c, the voltage of the scan signal terminal is $V_{Scan}$, the voltage of the data signal terminal is $V_{Data}$, the voltage of the light-emitting control signal terminal is $V_{Emission}$, the voltage of the touch control signal terminal is $V_{Select}$, the voltage of the second terminal of the capacitor is $V_A$, the voltage of the gate electrode of the drive transistor T0 in the case of a touch is $V_{B1}$, and the voltage of the gate electrode of the drive transistor T0 in the case of no touch is $V_{B2}$.

The working principle of the pixel circuit is as follows.

At the data write stage of the touch period (i.e. the first stage of the touch period), $V_{Scan}$ of the scan signal terminal and $V_{Data}$ of the data signal terminal are of low level, $V_{Emission}$ of the light-emitting control signal terminal and $V_{Select}$ of touch control signal terminal are of high level, and at this time, the first switch transistor T1 and the second switch transistor T2 are in a turned-on state, the fourth switch transistor T4, the fifth switch transistor T5, the sixth switch transistor T6 and the seventh switch transistor T7 are in a turned-off state, and the OLED is in a short-circuited state. The voltage $V_{DD}$ of the first reference signal terminal Ref1 directly flows into gate and source electrodes of the third switch transistor T3 via the second switch transistor T2, to let the third transistor T3 be in a turned-on state, and is output from the drain electrode of the third transistor T3 to the second end z2 of the capacitor Cst, wherein, the threshold voltage of the third switch transistor is $V_{th3}$, the voltage value $V_A$ of the second end z2 of the capacitor Cst turns to be $V_{DD}-V_{th3}$, thereby achieving storage of the threshold voltage of the third switch transistor at the second end z2 of the capacitor Cst. A data signal $V_{Data}$ output from the data signal terminal Data is written into the first end z1 of the capacitor connected to a drain electrode of the first switch transistor T1 via its source electrode, namely, the voltage of the first end z1 of the capacitor Cst turns into $V_{Data}$, the first end z1 of the capacitor Cst is connected to a gate electrode of the drive transistor T0, and the voltage of the gate electrode of the drive transistor T0 is also $V_{Data}$ (i.e., data write of $V_{Data}$ is realized at the gate electrode of the drive transistor). In this case, the photodiode PD is in a turned-off state, and whether there is a touch on the photodiode PD or not, gate voltages of the drive transistor T0 are both $V_{Data}$.

At the touch detection stage of the touch period (i.e. the second stage of the touch period), $V_{Select}$ of the touch control signal terminal is of low level, $V_{Scan}$ of the scan signal terminal, $V_{Data}$ of the data signal terminal, and $V_{Emission}$ of the light-emitting control signal terminal are of high level, and at this time, the first switch transistor T1, the second switch transistor T2, the fourth switch transistor T4, and the fifth switch transistor T5 are in a turned-off state, the sixth switch transistor T6 and the seventh switch transistor T7 are in a turned-on state, and the photodiode PD and the second reference signal terminal Ref2 are in a state of being connected. An OLED is turned on transiently, the voltage $V_{DD}$ of the first reference signal terminal Ref1 flows into gate and source electrodes of the third switch transistor T3 via the OLED, to let the third transistor T3 be in a turned-on state, and is output from the drain electrode of the third transistor T3 to the second end z2 of the capacitor Cst, so that the voltage value $V_A$ of the second end z2 of the capacitor Cst turns into $V_{DD}-V_{th3}-V_{th0}$, wherein, $V_{th0}$ is the threshold voltage of the luminous device OLED. Based on the principle of conservation of capacitance charge, the voltage of the first end z1 of the capacitor turns into $V_{DD}-V_{th3}-V_{th0}+(V_{Data}-V_{DD}+V_{th3})=V_{Data}-V_{th0}$ accordingly. At this time, if the photodiode PD is not irradiated with light (namely, there is a touch on it), that is, the photodiode PD is in a turned-off state, then the gate voltage $V_{B1}$ of the drive transistor T0 is maintained at $V_{Data}-V_{th0}$. If the photodiode PD is irradiated with light (namely, there is no touch on it), then photo-induced carriers are generated by the photodiode as a result of photoelectric effect so as to form a photocurrent. The photocurrent will cause the charge on the capacitor Cst to increase, so that the voltage of the first end z1 of the capacitor is raised, and in turn, the gate voltage $V_{B2}$ input into the drive transistor T0 is raised. This brings about the fact that a touch detection signal that is output finally from the drive transistor T0 and is output to a touch signal read terminal Sensor via the sixth switch transistor T6 becomes small. The size of the touch detection signal is related to the light intensity irradiated onto the photodiode, and the greater the light intensity is, the smaller the touch detection signal is.

At the data write stage of the display period (i.e. the first stage of the display period), $V_{Scan}$ of the scan signal terminal and $V_{Data}$ of the data signal terminal are of low level, $V_{Emission}$ of the light-emitting control signal terminal and $V_{Select}$ of touch control signal terminal are of high level, and at this time, the first switch transistor T1 and the second switch transistor T2 are in a turned-on state, the fourth switch transistor T4, the fifth switch transistor T5, the sixth switch transistor T6 and the seventh switch transistor T7 are in a turned-on state, and the OLED is in a short-circuited state. The voltage $V_{DD}$ of the first reference signal terminal Ref1 directly flows into gate and source electrodes of the third switch transistor T3 via the second switch transistor T2, to let the third transistor T3 be in a turned-on state, and is output from the drain electrode of the third transistor T3 to the second end z2 of the capacitor Cst, wherein, the threshold voltage of the third switch transistor is $V_{th3}$, the voltage value $V_A$ of the second end z2 of the capacitor Cst turns to be $V_{DD}-V_{th3}$, thereby achieving storage of the threshold voltage of the third switch transistor at the second end z2 of the capacitor Cst. A data signal $V_{Data}$ output from the data signal terminal Data is written into the first end z1 of the capacitor connected to a drain electrode of the first switch transistor T1 via its source electrode, namely, the voltage of the first end z1 of the capacitor Cst turns into $V_{Data}$, the first end z1 of the capacitor Cst is connected to a gate electrode of the drive transistor T0, and the voltage of the gate electrode of the drive transistor T0 is also $V_{Data}$ (i.e., data write of $V_{Data}$ is realized at the gate electrode of the drive transistor).

At the light-emitting drive stage of the display period (i.e. the second stage of the display period), $V_{Emission}$ of the light-emitting control signal terminal is of low level, $V_{Scan}$ of the scan signal terminal, $V_{Data}$ of the data signal terminal, and $V_{Select}$ of the touch control signal terminal are of high level, and at this time, the first switch transistor T1, the second switch transistor T2, the sixth switch transistor T6 and the seventh switch transistor T7 are in a turned-off state, the fourth switch transistor T4 and the fifth switch transistor T5 are in a turned-on state, the third switch transistor T3 is reversely cut off, and an OLED is turned on. The voltage $V_{DD}$ of the first reference signal terminal Ref1 directly flows into a second end z2 of the capacitor Cst via the fourth switch transistor T4, so that the voltage value $V_A$ of the second end z2 of the capacitor Cst turns into $V_{DD}$. Based on the principle of conservation of capacitance charge, the voltage of the first end z1 of the capacitor turns into $V_{DD}+(V_{Data}-V_{DD}+V_{th3})=V_{Data}+V_{th3}$ accordingly. At this time, the voltage between the source electrode and the gate electrode of the drive transistor T0 is $V_{gs}=V_g-V_s=V_{Data}+V_{th3}$.

As the drive transistor T0 operates in a saturated state, it can be known according to current characteristics in the saturated state that, the on-state current $i_d$ of the drive transistor T0 satisfies the formula: $i_d=K(V_{gs}-V_{th})^2=K(V_{Data}+V_{th3}-V_{th0})^2$, where K is a structural parameter, and the value is relatively stable for same structures, so that it can be regarded as a constant. Upon the threshold voltage $V_{th3}$ of the third switch transistor T3 being equal to the threshold voltage $V_{th0}$ of the drive transistor T0, the on-state current $i_d$ of the drive transistor T0 $i_d=K(V_{gs}-V_{th})^2=K(V_{Data}+V_{th3}-V_{th0})^2=(V_{Data})^2$. As can be seen from derivation of the formula, upon the threshold voltage $V_{th3}$ of the third switch transistor T3 being equal to the threshold voltage $V_{th0}$ of the drive transistor T0, a drain current flowing through the drive transistor T0 is merely related to the voltage $V_{Data}$ of a data signal, and has nothing to do with the threshold voltage $V_{th}$ of the drive transistor T0. Therefore, upon the on-state current $i_d$ being used for driving the luminous device D1 to give off light, the current flowing through each OLED is relatively uniform. There is no such case where the threshold voltage $V_{th}$ is non-uniform owing to the rear panel manufacturing process and this leads to the fact that the current flowing through each OLED differs, resulting in uneven brightness.

EXAMPLE 4

As illustrated in FIG. 2d, the drive transistor T0 and the third transistor T3 are P-type transistors, and the first switch transistor T1, the second switch transistor T2, the fourth switch transistor T4, the fifth switch transistor T5, the sixth switch transistor T6 and the seventh switch transistor T7 are N-type transistors.

Figure 3D:
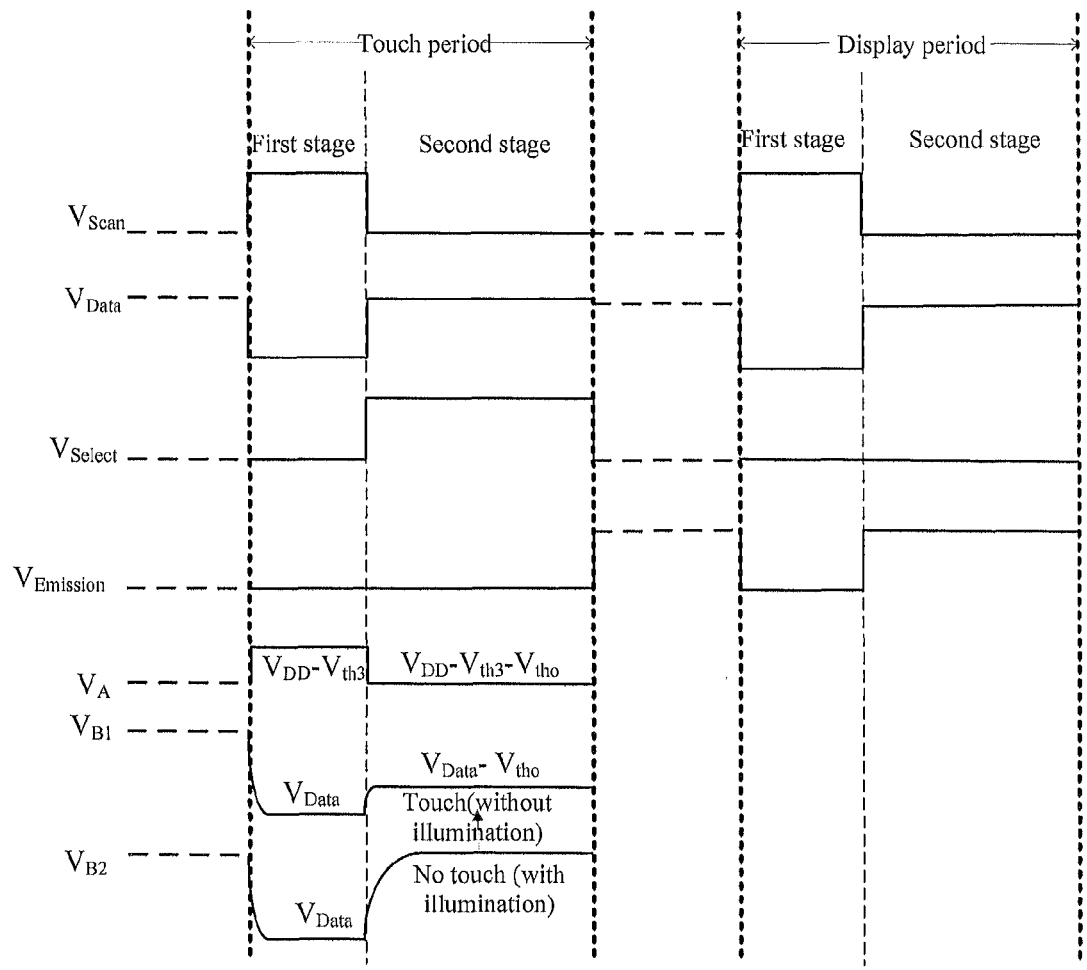

In a circuit signal timing diagram of the pixel circuit, as illustrated in FIG. 3d, the voltage of the scan signal terminal is $V_{Scan}$, the voltage of the data signal terminal is $V_{Data}$, the voltage of the light-emitting control signal terminal is $V_{Emission}$, the voltage of the touch control signal terminal is $V_{Select}$, the voltage of the second terminal of the capacitor is $V_A$, the voltage of the gate electrode of the drive transistor T0 in the case of a touch is $V_{B1}$, and the voltage of the gate electrode of the drive transistor T0 in the case of no touch is $V_{B2}$.

The working principle of the pixel circuit is as follows.

At the data write stage of the touch period (i.e. the first stage of the touch period), $V_{Scan}$ of the scan signal terminal is of high level, $V_{Data}$ of the data signal terminal, $V_{Emission}$ of the light-emitting control signal terminal and $V_{Select}$ of touch control signal terminal are of low level, and at this time, the first switch transistor T1 and the second switch transistor T2 are in a turned-on state, the fourth switch transistor T4, the fifth switch transistor T5, the sixth switch transistor T6 and the seventh switch transistor T7 are in a turned-off state, and the OLED is in a short-circuited state. The voltage $V_{DD}$ of the first reference signal terminal Ref1 directly flows into gate and source electrodes of the third switch transistor T3 via the second switch transistor T2, to let the third transistor T3 be in a turned-on state, and is output from the drain electrode of the third transistor T3 to the second end z2 of the capacitor Cst, wherein, the threshold voltage of the third switch transistor is $V_{th3}$, the voltage value $V_A$ of the second end z2 of the capacitor Cst turns to be $V_{DD}-V_{th3}$, thereby achieving storage of the threshold voltage of the third switch transistor at the second end z2 of the capacitor Cst. A data signal $V_{Data}$ output from the data signal terminal Data is written into the first end z1 of the capacitor connected to a drain electrode of the first switch transistor T1 via its source electrode, namely, the voltage of the first end z1 of the capacitor Cst turns into $V_{Data}$, the first end z1 of the capacitor Cst is connected to a gate electrode of the drive transistor T0, and the voltage of the gate electrode of the drive transistor T0 is also $V_{Data}$ (i.e., data write of $V_{Data}$ is realized at the gate electrode of the drive transistor). In this case, the photodiode PD is in a turned-off state, and whether there is a touch on the photodiode PD or not, gate voltages of the drive transistor T0 are both $V_{Data}$.

At the touch detection stage of the touch period (i.e. the second stage of the touch period), $V_{Select}$ of the touch control signal terminal and $V_{Data}$ of the data signal terminal are of high level, $V_{Scan}$ of the scan signal terminal and $V_{Emission}$ of the light-emitting control signal terminal are of low level, and at this time, the first switch transistor T1, the second switch transistor T2, the fourth switch transistor T4, and the fifth switch transistor T5 are in a turned-off state, the sixth switch transistor T6 and the seventh switch transistor T7 are in a turned-on state, and the photodiode PD and the second reference signal terminal Ref2 are in a state of being connected. An OLED is turned on transiently, the voltage $V_{DD}$ of the first reference signal terminal Ref1 flows into gate and source electrodes of the third switch transistor T3 via the OLED, to let the third transistor T3 be in a turned-on state, and is output from the drain electrode of the third transistor T3 to the second end z2 of the capacitor Cst, so that the voltage value $V_A$ of the second end z2 of the capacitor Cst turns into $V_{DD}-V_{th3}-V_{th0}$, wherein, $V_{th0}$ is the threshold voltage of the luminous device OLED. Based on the principle of conservation of capacitance charge, the voltage of the first end z1 of the capacitor turns into $V_{DD}-V_{th3}-V_{th0}+(V_{Data}-V_{DD}+V_{th3})=V_{Data}-V_{th0}$ accordingly. At this time, if the photodiode PD is not irradiated with light (namely, there is a touch on it), that is, the photodiode PD is in a turned-off state, then the gate voltage $V_{B1}$ of the drive transistor T0 is maintained at $V_{Data}-V_{th0}$. If the photodiode PD is irradiated with light (namely, there is no touch on it), then photo-induced carriers are generated by the photodiode as a result of photoelectric effect so as to form a photocurrent. The photocurrent will cause the charge on the capacitor Cst to increase, so that the voltage of the first end z1 of the capacitor is raised, and in turn, the gate voltage $V_{B2}$ input into the drive transistor T0 is raised. This brings about the fact that a touch detection signal that is output finally from the drive transistor T0 and is output to a touch signal read terminal Sensor via the sixth switch transistor T6 becomes small. The size of the touch detection signal is related to the light intensity irradiated onto the photodiode, and the greater the light intensity is, the smaller the touch detection signal is.

At the data write stage of the display period (i.e. the first stage of the display period), $V_{Scan}$ of the scan signal terminal is of high level, $V_{Data}$ of the data signal terminal, $V_{Emission}$ of the light-emitting control signal terminal and $V_{Select}$ of touch control signal terminal are low-level signals, and at this time, the first switch transistor T1 and the second switch transistor T2 are in a turned-on state, the fourth switch transistor T4, the fifth switch transistor T5, the sixth switch transistor T6 and the seventh switch transistor T7 are in a turned-on state, and the OLED is in a short-circuited state. The voltage $V_{DD}$ of the first reference signal terminal Ref1 directly flows into gate and source electrodes of the third switch transistor T3 via the second switch transistor T2, to let the third transistor T3 be in a turned-on state, and is output from the drain electrode of the third transistor T3 to the second end z2 of the capacitor Cst, wherein, the threshold voltage of the third switch transistor is $V_{th3}$, the voltage value $V_A$ of the second end z2 of the capacitor Cst turns to be $V_{DD}-V_{th3}$, thereby achieving storage of the threshold voltage of the third switch transistor at the second end z2 of the capacitor Cst. A data signal $V_{Data}$ output from the data signal terminal Data is written into the first end z1 of the capacitor connected to a drain electrode of the first switch transistor T1 via its source electrode, namely, the voltage of the first end z1 of the capacitor Cst turns into $V_{data}$, the first end z1 of the capacitor Cst is connected to a gate electrode of the drive transistor T0, and the voltage of the gate electrode of the drive transistor T0 is also $V_{Data}$ (i.e., data write of $V_{Data}$ is realized at the gate electrode of the drive transistor).

At the light-emitting drive stage of the display period (i.e. the second stage of the display period), $V_{Emission}$ of the light-emitting control signal terminal and $V_{Data}$ of the data signal terminal are of high level, $V_{Scan}$ of the scan signal terminal and $V_{Select}$ of the touch control signal terminal are of low level, and at this time, the first switch transistor T1, the second switch transistor T2, the sixth switch transistor T6 and the seventh switch transistor T7 are in a turned-off state, the fourth switch transistor T4 and the fifth switch transistor T5 are in a turned-on state, the third switch transistor T3 is reversely cut off, and an OLED is turned on. The voltage $V_{DD}$ of the first reference signal terminal Ref1 directly flows into a second end z2 of the capacitor Cst via the fourth switch transistor T4, so that the voltage value $V_A$ of the second end z2 of the capacitor Cst turns into $V_{DD}$. Based on the principle of conservation of capacitance charge, the voltage of the first end z1 of the capacitor turns into $V_{DD}+(V_{Data}-V_{DD}+V_{th3})=V_{Data}+V_{th3}$ accordingly. At this time, the voltage between the source electrode and the gate electrode of the drive transistor T0 is $V_{gs}=V_g-V_s=V_{Data}+V_{th3}$.

As the drive transistor T0 operates in a saturated state, it can be known according to current characteristics in the saturated state that, the on-state current $i_d$ of the drive transistor T0 satisfies the formula: $i_d=K(V_{gs}-V_{th})^2=K(V_{Data}+V_{th3}-V_{th0})^2$, where K is a structural parameter, and the value is relatively stable for same structures, so that it can be regarded as a constant. Upon the threshold voltage $V_{th3}$ of the third switch transistor T3 being equal to the threshold voltage $V_{th0}$ of the drive transistor T0, the on-state current $i_d$ of the drive transistor T0 $i_d=K(V_{gs}-V_{th})^2=K(V_{Data}+V_{th3}-V_{th0})^2=(V_{Data})^2$. As can be seen from derivation of the formula, upon the threshold voltage $V_{th3}$ of the third switch transistor T3 being equal to the threshold voltage $V_{th0}$ of the drive transistor T0, a drain current flowing through the drive transistor T0 is merely related to the voltage $V_{Data}$ of a data signal, and has nothing to do with the threshold voltage $V_{th}$ of the drive transistor T0. Therefore, upon the on-state current $i_d$ being used for driving the luminous device D1 to give off light, the current flowing through each OLED is relatively uniform. There is no such case where the threshold voltage $V_{th}$ is non-uniform owing to the rear panel manufacturing process and this leads to the fact that the current flowing through each OLED differs, resulting in uneven brightness.

Based on the same inventive concept, an organic electroluminescent display panel including the above pixel circuit provided by embodiments of the invention is further provided by an embodiment of the invention. As the principle to solve problems of the organic electroluminescent display panel is similar to that of one of the aforementioned pixel circuits, for implementation of the organic electroluminescent display panel, reference can be made to implementation of the pixel circuit, and repetitions are omitted here.

Based on the same inventive concept, a display device including the above organic electroluminescent display panel provided by the embodiment of the invention is further provided by an embodiment of the invention. The display device may be a display, a cell phone, a television, a notebook, an all-in-one machine, or the like. As for other constituent parts requisite to the display device, it should be understood by those ordinarily skilled in the art that each is provided therein, and they will not be described any more here, and should not be construed as limitative of the invention, either, With respect to a pixel circuit, an organic electroluminescent display panel and a display device provided by embodiments of the invention, the pixel circuit includes a luminous device, a photosensitive device, a drive control sub-module, a data write sub-module, a light-emitting control sub-module and a touch detection sub-module; wherein, a first terminal of the drive control sub-module is connected to a first terminal of the data write sub-module and a first terminal of the photosensitive device, respectively, its second terminal is connected to a first terminal of the luminous device and a second terminal of the data write sub-module, its third terminal is connected to a first terminal of the light-emitting control sub-module and a first terminal of the touch detection sub-module; a third terminal of the data write sub-module is connected to a data signal terminal, its fourth terminal is connected to a scan signal terminal, its fifth terminal is connected to a first reference signal terminal, a second terminal of the luminous device and a second terminal of the light-emitting control sub-module, respectively, its sixth terminal is connected to a third terminal of the light-emitting control sub-module; a fourth terminal of the light-emitting control sub-module is connected to a second reference signal terminal and a second terminal of the touch detection sub-module, respectively, a fifth terminal of the light-emitting control sub-module is connected to a light-emitting control signal terminal; a third terminal of the touch detection sub-module is connected to a second terminal of the photosensitive device, a fourth terminal of the touch detection sub-module is connected to a touch signal read terminal, a fifth terminal of the touch detection sub-module is connected to a touch control signal terminal. Upon the data write sub-module being turned on, a data signal at the data signal terminal is transmitted to the drive control sub-module by the data write sub-module; upon the light-emitting control sub-module being turned on, the light-emitting control sub-module controls the drive control sub-module to drive the luminous device to give off light, so as to achieve a display function; and upon the touch detection sub-module being turned on, the touch detection sub-module controls output of a touch detection signal from the drive control sub-module to a touch signal read terminal. The touch detection signal is decreased as the light intensity irradiated onto the photosensitive device is increased, so as to achieve a touch detecting function. Touch and display functions are integrated in the pixel circuit, so that the production cost involved in arranging a display drive circuit and a touch circuit separately can be saved, and thickness of the display panel can be thinned as well.

Descriptions made above are merely exemplary embodiments of the invention, but are not used to limit the protection scope of the invention. The protection scope of the invention is determined by attached claims.

This application claims the benefit of priority from Chinese patent application No. 201310329790.3, filed on Jul. 31, 2013, the disclosure of which is incorporated herein in its entirety by reference as a part of the present application.

The invention claimed is:

1. A pixel circuit, comprising: a luminous device, a photosensitive device, a drive control sub-module, a data write sub-module, a light-emitting control sub-module and a touch detection sub-module; wherein, a first terminal of the drive control sub-module is connected to a first terminal of the data write sub-module and a first terminal of the photosensitive device, respectively, a second terminal of the drive control sub-module is connected to a first terminal of the luminous device and a second terminal of the data write sub-module, respectively, a third terminal of the drive control sub-module is connected to a first terminal of the light-emitting control sub-module and a first terminal of the touch detection sub-module, respectively;

a third terminal of the data write sub-module is connected to a data signal terminal, a fourth terminal of the data write sub-module is connected to a scan signal terminal, a fifth terminal of the data write sub-module is connected to a first reference signal terminal, a second terminal of the luminous device and a second terminal of the light-emitting control sub-module, respectively, a sixth terminal of the data write sub-module is connected to a third terminal of the light-emitting control sub-module; under the control of the scan signal terminal, a data signal at the data signal terminal is transmitted to the drive control sub-module by the data write sub-module;

a fourth terminal of the light-emitting control sub-module is connected to a second reference signal terminal and a second terminal of the touch detection sub-module, respectively, a fifth terminal of the light-emitting control sub-module is connected to a light-emitting control signal terminal; under the control of the light-emitting control signal terminal, the light-emitting control sub-module controls the drive control sub-module to drive the luminous device to give off light;

a third terminal of the touch detection sub-module is connected to a second terminal of the photosensitive device, a fourth terminal of the touch detection sub-module is connected to a touch signal read terminal, a fifth terminal of the touch detection sub-module is connected to a touch control signal terminal; under the control of the touch control signal terminal, the touch detection sub-module controls output of a touch detection signal from the drive control sub-module to the touch signal read terminal, the touch detection signal being decreased as the light intensity irradiated onto the photosensitive device is increased.

2. The pixel circuit according to claim 1, wherein, the first terminal and the second terminal of the drive control sub-module are signal input terminals, the third terminal of the drive control sub-module is a signal output terminal;

the first terminal and the second terminal of the data write sub-module are signal output terminals, the third terminal, the fourth terminal, the fifth terminal and the sixth terminal of the data write sub-module are signal input terminals;

the first terminal, the second terminal and the fifth terminal of the light-emitting control sub-module are signal input terminals, the third terminal and the fourth terminal of the light-emitting control sub-module are signal output terminals;

the first terminal and the fifth terminal of the touch detection sub-module are signal input terminals, the fourth terminal of the touch detection sub-module is a signal output terminal; one of the second terminal and the third terminal of the touch detection sub-module is a signal input terminal, and the other one of the second terminal and the third terminal of the touch detection sub-module is a signal output terminal.

3. The pixel circuit according to claim 2, wherein, the drive control sub-module comprises a drive transistor, a gate electrode of which is the first terminal of the drive control sub-module, a drain electrode of which is the second terminal of the drive control sub-module, and a source electrode of which is the third terminal of the drive control sub-module.

4. The pixel circuit according to claim 3, wherein, the data write sub-module comprises a first switch transistor, a second switch transistor, a third switch transistor and a capacitor; wherein, a gate electrode of the first switch transistor is connected to the scan signal terminal, a source electrode of the first switch transistor is connected to the data signal terminal, and a drain electrode of the first switch transistor is connected to the gate electrode of the drive transistor and a first end of the capacitor, respectively;

a gate electrode of the second switch transistor is connected to the scan signal terminal, a source electrode of the second switch transistor is connected to the first reference signal terminal, and a drain electrode of the second switch transistor is connected to the drain electrode of the drive transistor;

upon the third switch transistor being a N-type transistor, a gate electrode and a source electrode of the third switch transistor are connected to the drain electrode of the drive transistor, respectively, a drain electrode of the third switch transistor is connected to a second end of the capacitor; upon the third switch transistor being a P-type transistor, a gate electrode and a source electrode of the third switch transistor are connected to the second end of the capacitor, respectively, and a drain electrode of the third switch transistor is connected to the drain electrode of the drive transistor.

5. The pixel circuit according to claim 4, wherein, the third switch transistor and the drive transistor have a same threshold voltage.

6. The pixel circuit according to claim 5, wherein, the photosensitive device is a photodiode;
upon the third switch transistor and the drive transistor being N-type transistors, a cathode of the photodiode is connected to the gate electrode of the drive transistor;
upon the third switch transistor and the drive transistor being P-type transistors, an anode of the photodiode is connected to the gate electrode of the drive transistor.

7. The pixel circuit according to claim 5, wherein, the light-emitting control sub-module comprises a fourth switch transistor and a fifth switch transistor;
a gate electrode of the fourth switch transistor is connected to the light-emitting control signal terminal, a source electrode of the fourth switch transistor is connected to the first reference signal terminal, a drain electrode of the fourth switch transistor is connected to the second end of the capacitor;
a gate electrode of the fifth switch transistor is connected to the light-emitting control signal terminal, a source electrode of the fifth switch transistor is connected to the source electrode of the drive transistor, a drain electrode of the fifth switch transistor is connected to the second reference signal terminal.

8. The pixel circuit according to claim 7, wherein, the fourth switch transistor and the fifth switch transistor are N-type transistors; or, the fourth switch transistor and the fifth switch transistor are P-type transistors.

9. The pixel circuit according to claim 4, wherein, the touch detection sub-module comprises a sixth switch transistor and a seventh switch transistor;
a gate electrode of the sixth switch transistor is connected to the touch control signal terminal, a source electrode of the sixth switch transistor is connected to the third terminal of the drive control sub-module, a drain electrode of the sixth switch transistor is connected to the touch signal read terminal;
a gate electrode of the seventh switch transistor is connected to the touch control signal terminal, a source electrode of the seventh switch transistor is connected to a second end of the photosensitive device, a drain electrode of the seventh switch transistor is connected to the second reference signal terminal.

10. The pixel circuit according to claim 3, wherein, the touch detection sub-module comprises a sixth switch transistor and a seventh switch transistor;
a gate electrode of the sixth switch transistor is connected to the touch control signal terminal, a source electrode of the sixth switch transistor is connected to the third terminal of the drive control sub-module, a drain electrode of the sixth switch transistor is connected to the touch signal read terminal;
a gate electrode of the seventh switch transistor is connected to the touch control signal terminal, a source electrode of the seventh switch transistor is connected to a second end of the photosensitive device, a drain electrode of the seventh switch transistor is connected to the second reference signal terminal.

11. The pixel circuit according to claim 2, wherein, the touch detection sub-module comprises a sixth switch transistor and a seventh switch transistor;
a gate electrode of the sixth switch transistor is connected to the touch control signal terminal, a source electrode of the sixth switch transistor is connected to the third terminal of the drive control sub-module, a drain electrode of the sixth switch transistor is connected to the touch signal read terminal;
a gate electrode of the seventh switch transistor is connected to the touch control signal terminal, a source electrode of the seventh switch transistor is connected to a second end of the photosensitive device, a drain electrode of the seventh switch transistor is connected to the second reference signal terminal.

12. The pixel circuit according to claim 1, wherein, the touch detection sub-module comprises a sixth switch transistor and a seventh switch transistor;
a gate electrode of the sixth switch transistor is connected to the touch control signal terminal, a source electrode of the sixth switch transistor is connected to the third terminal of the drive control sub-module, a drain electrode of the sixth switch transistor is connected to the touch signal read terminal;
a gate electrode of the seventh switch transistor is connected to the touch control signal terminal, a source electrode of the seventh switch transistor is connected to a second end of the photosensitive device, a drain electrode of the seventh switch transistor is connected to the second reference signal terminal.

13. The pixel circuit according to claim 12, wherein, the sixth switch transistor and the seventh switch transistor are N-type transistors; or, the sixth switch transistor and the seventh switch transistor are P-type transistors.

14. An organic electroluminescent display panel, comprising the pixel circuit according to claim 1.

15. A display device, comprising the organic electroluminescent display panel according to claim 14.

16. The organic electroluminescent display panel according to claim 14, wherein, the first terminal and the second terminal of the drive control sub-module are signal input terminals, the third terminal of the drive control sub-module is a signal output terminal;
the first terminal and the second terminal of the data write sub-module are signal output terminals, the third terminal, the fourth terminal, the fifth terminal and the sixth terminal of the data write sub-module are signal input terminals;
the first terminal, the second terminal and the fifth terminal of the light-emitting control sub-module are signal input terminals, the third terminal and the fourth terminal of the light-emitting control sub-module are signal output terminals;
the first terminal and the fifth terminal of the touch detection sub-module are signal input terminals, the fourth terminal of the touch detection sub-module is a signal output terminal; one of the second terminal and the third terminal of the touch detection sub-module is a signal input terminal, and the other one of the second terminal and the third terminal of the touch detection sub-module is a signal output terminal.

17. The organic electroluminescent display panel according to claim 16, wherein, the drive control sub-module comprises a drive transistor, a gate electrode of which is the first terminal of the drive control sub-module, a drain electrode of which is the second terminal of the drive control sub-module, and a source electrode of which is the third terminal of the drive control sub-module.

18. The organic electroluminescent display panel according to claim 17, wherein, the data write sub-module comprises a first switch transistor, a second switch transistor, a third switch transistor and a capacitor; wherein, a gate electrode of the first switch transistor is connected to the scan signal terminal, a source electrode of the first switch transistor is connected to the data signal terminal, and a drain electrode of the first switch transistor is connected to the gate electrode of the drive transistor and a first end of the capacitor, respectively;

a gate electrode of the second switch transistor is connected to the scan signal terminal, a source electrode of the second switch transistor is connected to the first reference signal terminal, and a drain electrode of the second switch transistor is connected to the drain electrode of the drive transistor;

upon the third switch transistor being a N-type transistor, a gate electrode and a source electrode of the third switch transistor are connected to the drain electrode of the drive transistor, respectively, a drain electrode of the third switch transistor is connected to a second end of the capacitor; upon the third switch transistor being a P-type transistor, a gate electrode and a source electrode of the third switch transistor are connected to the second end of the capacitor, respectively, and a drain electrode of the third switch transistor is connected to the drain electrode of the drive transistor.

19. The organic electroluminescent display panel according to claim 18, wherein, the third switch transistor and the drive transistor have a same threshold voltage.

20. The organic electroluminescent display panel according to claim 19, wherein, the photosensitive device is a photodiode;

upon the third switch transistor and the drive transistor being N-type transistors, a cathode of the photodiode is connected to the gate electrode of the drive transistor; upon the third switch transistor and the drive transistor being P-type transistors, an anode of the photodiode is connected to the gate electrode of the drive transistor.

* * * * *